(12) United States Patent
Oshio et al.

(10) Patent No.: US 8,703,264 B2
(45) Date of Patent: Apr. 22, 2014

(54) OPTICAL DISC

(75) Inventors: Atsushi Oshio, Saitama (JP); Junji Yamaguchi, Saitama (JP); Daisuke Ito, Saitama (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/255,301

(22) PCT Filed: Sep. 1, 2009

(86) PCT No.: PCT/JP2009/004283
§ 371 (c)(1),
(2), (4) Date: Nov. 18, 2011

(87) PCT Pub. No.: WO2010/103581
PCT Pub. Date: Sep. 16, 2010

(65) Prior Publication Data
US 2012/0060175 A1 Mar. 8, 2012

(30) Foreign Application Priority Data
Mar. 11, 2009 (JP) ................................ 2009-057830

(51) Int. Cl.
*B32B 3/02* (2006.01)
*G11B 7/24* (2013.01)

(52) U.S. Cl.
USPC ..................... 428/65.1; 428/64.4; G9B/7.182

(58) Field of Classification Search
CPC ...... G11B 7/2542; C08G 63/16; C08G 63/20; C08G 63/47; C08G 63/916; C08F 290/61; C08F 222/1006

USPC ........................... 428/64.4, 65.1; G9B/7.182
See application file for complete search history.

(56) References Cited

U.S. PATENT DOCUMENTS

2009/0324870 A1* 12/2009 Ito et al. ........................ 428/65.1
2010/0196650 A1* 8/2010 Okawa et al. ................. 428/64.4

FOREIGN PATENT DOCUMENTS

| JP | 2003-123316 A | 4/2003 |
| JP | 2005-319459 A | 11/2005 |
| JP | 2007-262334 A | 10/2007 |
| JP | 2008-108416 A | 5/2008 |
| WO | WO 2008041547 A1 * | 4/2008 |
| WO | WO 2009133924 A1 * | 11/2009 |

* cited by examiner

*Primary Examiner* — Gerard Higgins
(74) *Attorney, Agent, or Firm* — McDermott Will & Emery LLP

(57) ABSTRACT

Provided is an optical disc in which at least a light reflecting layer and a light transmitting layer that includes a cured film of an ultraviolet curable composition are stacked on a substrate, and information is reproduced by making a blue laser beam be incident on the optical disc from a side of the light transmitting layer, wherein an elastic modulus (25° C.) measured by indenting a Vickers indenter having a vertex angle of 136° under a load of 100 mN into a surface of the cured film of the ultraviolet curable composition is 1,500 MPa or less; and a loss modulus (E") at 60° C. in a dynamic viscoelastic spectrum of the cured film measured at a frequency of 3.5 Hz is 10 MPa or less. Thus, warpage is reduced during curing and plastic deformation is less likely even under a load for a long period of time.

6 Claims, 2 Drawing Sheets

OPTICAL DISC

CROSS REFERENCE TO PRIOR APPLICATIONS

This application is a U.S. National Phase application under 35 U.S.C. §371 of International Application No. PCT/JP2009/004283, filed on Sep. 1, 2009 and claims benefit of priority to Japanese Patent Application No. 2009-057830, filed on Mar. 11, 2009. The International Application was published in Japanese on Sep. 16, 2010 as WO 2010/103581 A1 under PCI Article 21(2). The contents of the applications are hereby incorporated by reference.

TECHNICAL FIELD

The present invention relates to an ultraviolet curable composition suitable for a light transmitting layer of an optical disc in which at least a light reflecting layer and a light transmitting layer are formed, and recording or reproduction is performed with a semiconductor laser beam having a lasing wavelength in the range of 370 to 430 nm (hereafter, referred to as a blue laser beam) made incident on the optical disc through the light transmitting layer.

BACKGROUND ART

DVDs (digital versatile discs), which are commonly used optical discs that allow for high-density recording, have a structure in which two substrates having a thickness of 0.6 mm are bonded together with an adhesive. To achieve a high density in DVDs, a laser beam having a short wavelength of 650 nm and an optical system having a high numerical aperture are used, compared with the case of CDs (compact-discs).

However, to record or reproduce, for example, high-definition images for HDTV (high definition television), a further increase in the density is required. Methods for performing higher-density recording for the next generation of DVDs and optical discs to be used with the methods have been studied; and a method for performing high-density recording has been proposed that employs a new optical-disc structure with a blue laser beam having a short wavelength and an optical system having a high numerical aperture, compared with the case of DVDs.

This new optical disc has a structure in which a recording layer is formed on a transparent or opaque substrate composed of a plastic such as polycarbonate; a light transmitting layer having about 100 μm is further stacked on the recording layer; and a recording beam, a reproduction beam, or both of the beams are made incident on the optical disc through the light transmitting layer. In view of productivity, use of an ultraviolet curable composition for a light transmitting layer of such an optical disc has been actively studied.

Such an optical disc used with a blue laser beam needs to keep recording-reproduction characteristics with stability for a long period of time. Accordingly, the light transmitting layer desirably does not adversely affect the recording-reproduction characteristics due to surface deformation or scratching thereof even after being used for a long period of time. For DVDs and CDs, a recording beam or a reproduction beam is made incident on a surface composed of a plastic material such, as polycarbonate. In contrast, for the above-described optical disc, a cured film, of an ultraviolet curable composition serves as an incident surface and the film under a load for a long period of time has a problem of an increase in signal reproduction errors due to deformation or the like thereof, compared with polycarbonate.

To prevent deformation of the light transmitting layer under a load, the light transmitting layer is desirably a rigid cured film. For example, an optical information medium including a light transmitting layer having a dynamic elastic modulus of 1.5 to 3.0 GPa at 25° C. has been disclosed (refer to Patent Literature 1). However, this disc under a load for a long period of time has a problem of an increase in signal reproduction errors.

Patent Literature 1: Japanese Unexamined Patent Application Publication No. 2003-123316

DISCLOSURE OF INVENTION

Technical Problem

An object of the present invention is to provide an optical disc in which warpage is less likely to be caused; errors of reproduced signals are less likely to increase even under a load for a long period of time; recovery from the errors is achieved over time; and, as a result, signal reproduction can be appropriately achieved.

Solution to Problem

An optical disc according to the present invention is an optical disc having a light transmitting layer in which an elastic modulus (25° C.) measured by indenting a Vickers indenter having a vertex angle of 136° under a load of 100 mN into the light transmitting layer is 1,500 MPa or less; and a loss modulus (E") at 60° C. in a dynamic viscoelastic spectrum measured at a frequency of 3.5 Hz is 10 MPa or less. To form a light transmitting layer that is less likely to deform under an external load, a cured film having a high elastic modulus is preferably used. However, an excessively high elastic modulus results in serious warpage of a disc, which is problematic. When an elastic modulus that does not cause the problem of warpage of a disc is employed, plastic deformation is caused under a load for a long period of time, resulting in a disadvantage in that reproduced signals are unreadable. The inventors of the present invention have found that, by making the indentation elastic modulus and the loss modulus in a dynamic viscoelastic spectrum be in the specific ranges, warpage is less likely to be caused in curing; plastic deformation is less likely to be caused even under a load for a long period of time or as a result of an impact due to falling or the like; and appropriate signal reproduction characteristics can be achieved.

Specifically, the present invention provides an optical disc in which at least a light reflecting layer and a light transmitting layer that includes a cured film of an ultraviolet curable composition are stacked on a substrate, and information is reproduced by making a blue laser beam be incident on the optical disc from a side of the light transmitting layer, wherein an elastic modulus (25° C.) measured by indenting a Vickers indenter having a vertex angle of 136° under a load of 100 mN into a surface of the cured film of the ultraviolet curable composition is 1,500 MPa or less; and a loss modulus (E") at 60° C. in a dynamic viscoelastic spectrum of the cured film measured at a frequency of 3.5 Hz is 10 MPa or less.

Advantageous Effects of Invention

In an optical disc according to the present invention, warpage is less likely to be caused; errors of reproduced signals are less likely to increase even under a load for a long period of time; recovery from the errors is achieved over time; and, as a result, signal reproduction can be appropriately achieved.

BEST MODES FOR CARRYING OUT THE INVENTION

An optical disc according to the present invention is an optical disc in which at least a light reflecting layer and a light transmitting layer that includes a cured film of an ultraviolet curable composition are stacked on a substrate, and information is reproduced by making a blue laser beam be incident on the optical disc from a side of the light transmitting layer, wherein an elastic modulus (25° C.) measured by indenting a Vickers indenter having a vertex angle of 136° under a load of 100 mN into a surface of the cured film of the ultraviolet curable composition is 1,500 MPa or less; and a loss modulus (E") at 60° C. in a dynamic viscoelastic spectrum of the cured film measured at a frequency of 3.5 Hz is 10 MPa or less.

Substrate

A substrate used for an optical disc according to the present invention may be a disc-shaped circular resin substrate. The resin is preferably polycarbonate. When an optical disc is for reproduction only, pits responsible for information recording are formed in a surface of a substrate on which a light reflecting layer is to be stacked. In the case of a Blu-ray disc from which information is read with a blue laser beam having a lasing wavelength of 370 to 430 nm, a substrate having a thickness of about 1.1 mm can be used.

Light Reflecting Layer

A light reflecting layer used for an optical disc according to the present invention should be a layer that can reflect a laser beam and form an optical disc allowing for recording and reproduction. The light reflecting layer may be formed of, for example, a metal such as gold, copper, or aluminum; an alloy of the foregoing; or an inorganic compound of silicon or the like. In particular, silver or an alloy mainly containing silver is preferably used because of a high reflectivity of light having a wavelength close to 400 nm. The light reflecting layer preferably has a thickness of about 10 to 60 nm.

Light Transmitting Layer

A light transmitting layer used for an optical disc according to the present invention has an elastic modulus (25° C.) of 1,500 MPa or less, preferably 50 to 1,300 MPa, more preferably 50 to 900 MPa, most preferably 50 to 600 MPa, the elastic modulus being measured by indenting a Vickers indenter having a vertex angle of 136° under a load of 100 mN into the light transmitting layer. By making the light transmitting layer have an elastic modulus within such a range, the light transmitting layer is less likely to warp in curing with ultraviolet rays and recovery from deformation even due to a load for a long period of time tends to be achieved. Thus, recording and reproduction of information can be appropriately performed. When the light transmitting layer has an excessively low elastic modulus, the surface of the light transmitting layer tends to be scratched, which is problematic. When the light transmitting layer has an excessively high elastic modulus, the optical disc considerably warps, which is problematic. When the elastic modulus is made 400 to 900 MPa, preferably 400 to 600 MPa, good curability is achieved. Accordingly, under production conditions requiring good curability, the elastic modulus is preferably made in such a range.

An elastic modulus can be measured with a Vickers indenter in accordance with ISO standards ISO14577.

An elastic modulus measured by indenting a Vickers indenter having a vertex angle of 136° in accordance with ISO14577 is represented as an indentation elastic modulus $E_{IT}$. A plastic deformation percentage is represented as an indentation creep $C_{IT}$ and calculated with the following formula.

$$C_{IT} = \frac{h2 - h1}{h1} \times 100$$

where h1 represents an indentation depth at the time when the load has reached 100 mN and h2 represents an indentation depth at the time when the load has been maintained for 60 seconds after it reaches 100 mN.

As a measurement device that complies with ISO14577, a FISCHERSCOPE HM2000 manufactured by Fischer Instruments K.K. can be used to perform the measurement.

A light transmitting layer used in the present invention preferably has a plastic deformation percentage of 60% or less at the time when a Vickers indenter having a vertex angle of 136° is indented therein under a load of 100 mN and the load has been maintained for 60 seconds, more preferably 40% or less, particularly preferably 25% or less. When the plastic deformation percentage is made in such a range, recovery from deformation caused by a load for a long period of time tends to be achieved over time.

In an optical disc according to the present invention, a light transmitting layer is used that has a loss modulus (E") of 10 MPa or less at 60° C. in a dynamic viscoelastic spectrum measured at a frequency of 3.5 Hz, preferably 0.1 to 7 MPa, more preferably 0.1 to 5 MPa. When the loss modulus at 60° C. is made in such a range, errors of reproduced signals are less likely to increase even under a load for a long period of time and recovery from the errors is achieved over time so that signal reproduction can be appropriately achieved.

As for the measurement of a dynamic viscoelastic spectrum, the light transmitting layer is blanked with a dumbbell cutter into a specimen having the shape of Specimen No. 5 according to JIS K 7127. Such a specimen is measured with a dynamic visco-elastometer RSA-II (frequency: 3.5 Hz, temperature increase rate: 3° C./min) manufactured by Rheoraetric Scientific, Inc.

In an optical disc according to the present invention, a loss tangent (tan δ) at 60° C. in the thus-measured dynamic viscoelastic spectrum is preferably 0.25 or less, particularly preferably 0.01 to 0.20 or less. When the loss tangent at 60° C. is in such a range, errors of reproduced signals are less likely to increase even under a load for a long period of time and recovery from the errors is achieved over time so that signal reproduction can be appropriately achieved.

A light transmitting layer in an optical disc according to the present invention preferably transmit therethrough a blue laser beam having a basing wavelength of 370 to 430 nm efficiently. In the light transmitting layer having a thickness of 100 μm, the transmittance of 405 nm light is preferably 85% or more, particularly preferably 90% or more.

A light transmitting layer in an optical disc according to the present invention preferably has a thickness of 70 to 110 μm, particularly preferably 90 to 110 μm. In the present invention, a light transmitting layer that has the specific indentation elastic modulus, the specific loss modulus, and such a thickness is applied to an optical disc. As a result, warpage of the optical disc can be suppressed; plastic deformation is also less likely to be caused even under a load from the outside of the optical disc for a long period of time or as a result of an impact due to falling or the like; and, even when the optical disc is deformed, the optical disc tends to recover from the deformation in a short period of time. Accordingly, the optical disc particularly becomes excellent in an impact buffer property and a deformation recovery property under an impact or pressure from the outside of the optical disc and hence the stability of reading signals from the optical disc can be further enhanced. Although the thickness of the light transmitting layer is normally set at about 100 μm, since the thickness considerably influences light transmittance, reading of signals, and recording, the thickness needs to be sufficiently controlled. The light transmitting layer may be constituted by a single cured layer having such a thickness or a stack of a plurality of layers.

[Chem. 2]

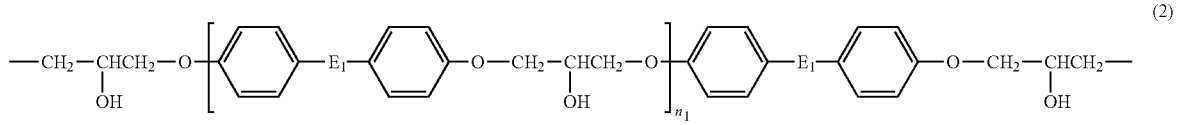

(2)

A light transmitting layer in an optical disc according to the present invention is a light transmitting layer constituted by a cured film of an ultraviolet curable composition. The ultraviolet curable composition should form, a cured film that has the elastic modulus, the plastic deformation percentage, and a loss modulus (E″) of 10 MPa or less at 60° C. in a dynamic viscoelastic spectrum measured at a frequency of 3.5 Hz. An ultraviolet curable composition mainly containing a (meth) acrylate oligomer and/or a (meth)acrylate monomer can be preferably used.

[(Meth)acrylate Oligomer]

A (meth)acrylate oligomer used for an ultraviolet curable composition for forming a light transmitting layer is not particularly limited and examples thereof include various urethane (meth)acrylates, epoxy(meth)acrylates, polyester (meth)acrylates, and polyether (meth)acrylates. Of these, urethane (meth)acrylates and epoxy (meth)acrylates can be preferably used because the concentration of a (meth)acryloyl group of an ultraviolet curable composition and the elastic modulus of the cured composition are readily adjusted to be in the ranges. In particular, compared with use of urethane (meth)acrylates, when epoxy (meth)acrylates are used, the resultant cured films have a dominant elastic term in which recovery from deformation even due to the application of a load can be achieved over time and a decrease in the light reflectivity of light reflecting layers on exposure to light can be suppressed, which is preferable.

The content of an oligomer in (meth)acrylates in an ultraviolet curable composition according to the present invention may be appropriately adjusted by changing the combination of a (meth)acrylate oligomer and a (meth)acrylate monomer that are used. The content of such an oligomer with respect to an ultraviolet curable compound contained in the ultraviolet curable composition is preferably 80 mass % or less, more preferably 20 to 60 mass % because a light transmitting layer having a large thickness can be appropriately formed.

An epoxy (meth)acrylate used in the present invention is, for example, preferably an epoxy (meth)acrylate represented by the following formula (1).

[Chem. 1]

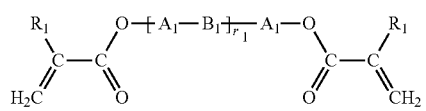

(1)

In the formula (1), $R_1$s each independently represent a hydrogen atom or a methyl group. $R_1$s preferably represent a hydrogen atom to provide good curability. In the formula (1), $r_1$ represents 1 to 15. In particular, to provide a good coating property, n preferably represents 1 to 10, more preferably 1 to 8.

In the formula (1), $A_1$ is a group represented by the following formula (2).

In the formula (2), $E_1$s each independently represent —$SO_2$—, —$CH_2$—, —$CH(CH_3)$—, or —$C(CH_3)_2$—, and $n_1$ represents an integer of 0 to 8. Examples of such a group represented by the formula (2) include a residual moiety in which epoxy groups at both ends are removed from a bisphenol A epoxy resin, a residual moiety in which epoxy groups at both ends are removed from a bisphenol S epoxy resin, a residual moiety in which epoxy groups at both ends are removed from a bisphenol F epoxy resin, and a residual moiety in which epoxy groups at both ends are removed from a bisphenol AD epoxy resin. In the formula (2), $E_1$s preferably represent —$C(CH_3)_2$— because good mechanical properties are provided while flexibility is maintained: specifically, for example, the formula (2) preferably represents a residual moiety in which epoxy groups at both ends are removed from a bisphenol A epoxy resin. In the formula (2), $n_1$ preferably represents an integer of 0 to 6 to provide a good coating property.

$B_1$ in the formula (1) is one or more groups selected from the group consisting of the following formulae (3), (4), and (5).

[Chem. 3]

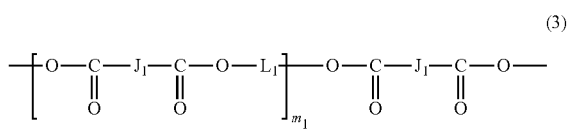

(3)

[Chem. 4]

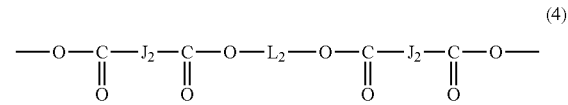

(4)

[Chem. 5]

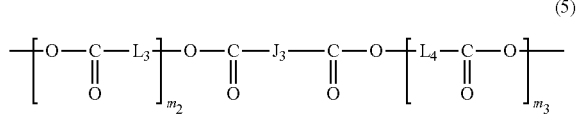

(5)

In the groups represented by the formulae (3), (4), and (5), $J_1$ to $J_3$ represent a divalent aromatic hydrocarbon group or a divalent aliphatic hydrocarbon group having 2 to 20 carbon atoms. Examples of the divalent aromatic hydrocarbon group include an o-phenylene group, a m-phenylene group, a p-phenylene group, an o-xylene-α,α'-diyl group, a m-xylene-α,α'-diyl group, and a p-xylene-α,α'-diyl group. Examples of the divalent aliphatic hydrocarbon group include $C_{1-20}$ alkylene groups such as an ethylene group, a propylene group, a butylene group, a hexamethylene group, an octamethylene group, a decamethylene group, a dodecamethylene group, a hexadecamethylene group, and an octadecamethylene group; and alicyclic hydrocarbon groups such as a cyclopentane-diyl group and a cyclohexane-diyl group. $J_1$ to $J_3$ preferably represent a divalent $C_{2-10}$ aliphatic hydrocarbon group to provide good flexibility, more preferably a $C_{3-8}$ alkylene group.

A hydrogen atom in the divalent aromatic hydrocarbon group may be replaced with an alkyl group. By using a divalent aromatic hydrocarbon group in which a hydrogen atom is replaced with an alkyl group as $J_1$ to $J_3$, compatibility in the resin composition can be controlled, which is advantageous.

Examples of the alkyl group include a methyl group, an ethyl group, a propyl group, a hexyl group, and an octyl group. Among alkyl groups, alkyl groups having 1 to 6 carbon atoms are preferred, in terms of compatibility.

The divalent aliphatic hydrocarbon group may be linear or branched.

In the group represented by the formula (3), $L_1$ represents a divalent aliphatic hydrocarbon group having 2 to 20 carbon atoms or —$(RO)_q$—R— (R represents an alkylene group having 2 to 8 carbon atoms). Examples of the divalent aliphatic hydrocarbon having 2 to 20 carbon atoms include the divalent aliphatic hydrocarbon groups having 2 to 20 carbon atoms and exemplified above for $J_1$ to $J_3$. Among divalent aliphatic hydrocarbon groups having 2 to 20 carbon atoms, $C_{2-4}$ alkylene groups are preferred in terms of flexibility. The divalent aliphatic hydrocarbon having 2 to 20 carbon atoms may have a branched chain. Examples of the alkylene group having 2 to 8 carbon atoms for $R_2$ above include an ethylene group, a propylene group, a butylene group, a hexamethylene group, and an octamethylene group. Among alkylene groups, $C_{2-6}$ alkylene groups are preferred, in terms of flexibility. In —$(RO)_q$—R—, q represents an integer of 1 to 10. In particular, $C_{2-4}$ alkylene groups are preferred in terms of flexibility. As $L_1$, $C_{2-4}$ alkylene groups are preferred in terms of flexibility.

In the group represented by the formula (3), $m_1$ represents an integer of 1 to 20; and $m_1$ represents 1 to 10 in terms of durability.

In the group represented by the formula (4), $L_2$ represents an alkyl diol residue or a polyether diol residue, each of which has a number-average molecular weight, of 250 to 10,000.

In the group represented by the formula (4), $L_3$ and $L_4$ each independently represent a divalent aliphatic hydrocarbon group having 2 to 10 carbon atoms. Examples of the aliphatic hydrocarbon group include $C_{2-10}$ alkylene groups such as an ethylene group, a propylene group, a butylene group, a hexamethylene group, and an octamethylene group; and divalent aliphatic hydrocarbon groups having 2 to 10 carbon atoms such as a cyclopentane-diyl group and a cyclohexane-diyl group. Such a divalent aliphatic hydrocarbon having 2 to 10 carbon atoms may have a branched chain. $m_2$ and $m_3$ each independently represent an integer of 1 to 20.

Among the formulae (3), (4), and (5), the formula (3) is preferred because high durability and high flexibility are provided.

Examples of an epoxy (meth)acrylate represented by the formula (1) include a reaction product of a polyester dicarboxylic acid generated from, ethylene glycol and adipic acid, a bisphenol A epoxy resin, and acrylic acid; a reaction product of a polyester dicarboxylic acid generated from propylene glycol and adipic acid, a bisphenol A epoxy resin, and acrylic acid; a reaction product of a polyester dicarboxylic acid generated from ethylene glycol and adipic acid, a bisphenol F epoxy resin, and acrylic acid; a reaction product of a polyester dicarboxylic acid generated from propylene glycol and adipic acid, a bisphenol F epoxy resin, and acrylic acid; a reaction product of a polyester dicarboxylic acid generated from ethylene glycol and adipic acid, a bisphenol A epoxy resin, and methacrylic acid; a reaction product of a polyester dicarboxylic acid generated from propylene glycol and adipic acid, a bisphenol A epoxy resin, and methacrylic acid; a reaction product of a polyester dicarboxylic acid generated from ethylene glycol and sebacic acid, a bisphenol A epoxy resin, and acrylic acid; a reaction product of a polyester dicarboxylic acid generated from propylene glycol and sebacic acid, a bisphenol A epoxy resin, and acrylic acid; a reaction product of a polyester dicarboxylic acid generated from ethylene glycol and hexahydrophthalic anhydride, a bisphenol A epoxy resin, and acrylic acid; and a reaction product of a polyester dicarboxylic acid generated from propylene glycol and hexahydrophthalic anhydride, a bisphenol A epoxy resin, and acrylic acid.

An epoxy (meth)acrylate represented by the formula (1) includes in the skeleton thereof a rigid bisphenol epoxy moiety represented by the formula (2) and a flexible polyester moiety represented by the formulae (3) to (5). As a result, the elastic modulus of the resultant cured film can be made low and distortion within the cured film due to curing can be relieved to suppress warpage. When the composition is used for a light transmitting layer in an optical disc having a reflecting film composed of silver or a silver alloy, high durability and high light resistance can be provided.

A method for producing an epoxy (meth)acrylate represented by the formula (1) is not particularly limited. Examples of this method include a two-step synthetic method in which a compound (A) that provides a moiety represented by the formulae (3) to (5) and has two carboxyl groups in each molecule is allowed to react with a compound (B) that provides a moiety represented by the formula (2) and has two glycidyl groups in each molecule, and the resultant product is allowed to react with a compound (C) having a single radical-polymerizable unsaturated double bond and a single carboxyl group in each molecule to provide a radical-polymerizable compound (I) represented by the formula (1); and a one-step synthetic method in which the compounds (A), (B), and (C) are simultaneously added and allowed to react to provide the epoxy (meth)acrylate.

The two-step synthetic method is specifically performed in the following manner. The first-step reaction is performed such that one molecule of the compound (A) that provides a moiety represented by the formulae (3) to (5) and has two carboxyl groups in each molecule reacts with two molecules of the compound (B) that provides a moiety represented by the formula (2) and has two glycidyl groups in each molecule. At this time, the reaction between the carboxyl groups of the compound (A) that has two carboxyl groups in each molecule and the compound (B) that has two glycidyl groups in each molecule is performed such that the molar ratio of the carboxyl groups of the compound (A) to the compound (B) is 1.1 to 2, preferably 1.2 to 1.8, to provide a glycidyl-terminated compound.

Subsequently, as the second-step reaction, the glycidyl-terminated, compound obtained in the previous reaction is allowed to react with the compound (C) having a single radical-polymerizable unsaturated double bond and a single carboxyl group in each molecule such that the molar ratio of the glycidyl groups of the glycidyl-terminated compound is 0.9 to 1.1, preferably in equimolar amounts, to provide the radical-polymerizable compound (I) represented, by the formula (1).

The first-step reaction is desirably performed at a reaction temperature of 60° C. to 150° C., preferably 70° C. to 140° C. The second-step reaction is desirably performed in the presence of an inhibitor at a reaction temperature of 60° C. to 140° C., preferably 70° C. to 130° C., because the reaction time becomes long at 60° C. or less and polymerization of the unsaturated double bonds of the compound (B) tends to occur at 140° C. or more. As a ring-opening catalyst for glycidyl groups, a desired publicly known catalyst can be used. Representative examples of such a catalyst include tertiary amines such as triethylenediamine, tri-n-butylamine, and dimethylaminoethyl methacrylate; imidazoles; phosphines such as triphenyl phosphite, phosphite, triphenyl phosphine, tris-(2,6-dimethoxyphenyl)phosphine, and tri-tolyl phosphine; phosphonium salts such as tetraphenyl phosphonium bromide and tetrabutyl phosphonium hydroxide. In the present invention, the amount of a catalyst used in the production of an epoxy (meth)acrylate represented by the formula (1) with respect to the total amount of the compounds used in the reaction is preferably made 1 mass % or less, particularly preferably 0.3 mass % or less, most preferably 0.1 to 0.01 mass %.

Examples of the compound (A) that provides a moiety represented by the formulae (3) to (5) and has two carboxyl groups in each molecule include:
(i) a polyester dicarboxylic acid having carboxyl groups at both ends of molecular chains that are produced by allowing a diol to react with a dibasic acid;
(ii) a dicarboxylic acid produced by allowing an acid anhydride to react with hydroxy groups at the molecular ends of a long-chain alkyl diol or a polyether diol; and
(iii) a dicarboxylic acid having carboxyl groups at the molecular ends such as a dicarboxylic acid obtained by allowing a dibasic acid to react with a lactone compound.

Specifically, as for the polyester dicarboxylic acid (i), by adjusting a molar ratio of a dibasic acid to a diol such that the amount of the dibasic acid is made larger than that of the diol (dibasic acid/diol=2 to 1 mol), a dicarboxylic acid having a desired molecular weight can be provided. Such a diol may be a divalent aliphatic hydrocarbon group having 2 to 20 carbon atoms that may optionally have a branched chain or —($R^2$O)$_q$—$R^2$— ($R^2$ represents an alkylene group that has 2 to 8 carbon atoms and may optionally have a branched chain; and q represents an integer of 1 to 10). Specific examples of the diol include diols: ethylene glycol, diethylene glycol, triethylene glycol, tetraethylene glycol, octamethylene glycol, propylene glycol, dipropylene glycol, tripropylene glycol, tetrapropylene glycol, octapropylene glycol, cyclohexane-1,4-dimethanol, 1,3-butylene glycol, 1,4-butylene glycol, ditetramethylene glycol, tritetramethylene glycol, tetratetramethylene glycol, octatetramethylene glycol, neopentyl glycol, 1,6-hexanediol, 3-methyl-1,5-pentanediol, 2-ethyl-1,3-hexanediol, 2-butyl-2-ethyl-1,3-propanediol, 2-methyl-1,8-octanediol, 1,9-nonanediol, cyclohexyldimethanol, ethylene oxide adducts of bisphenol A, ethylene oxide adducts of bisphenol F, hydrogenated bisphenol A, hydrogenated bisphenol F, and castor-oil-modified diols.

The dibasic acid that is allowed to react with a diol may be a dibasic acid having a divalent aromatic hydrocarbon group in which a hydrogen atom may be replaced with an alkyl group having 1 to 6 carbon atoms or a divalent aliphatic hydrocarbon group that has 2 to 1.0 carbon atoms and may optionally have a branched chain. Examples of the dibasic acid include aliphatic dibasic acids such as succinic acid, succinic anhydride, adipic acid, azelaic acid, sebacic acid, and dimer acid; aromatic polybasic acids such as phthalic anhydride, isophthalic acid, and terephthalic acid; and alicyclic dibasic acids such as tetrahydro anhydride and derivatives thereof, hexahydrophthalic anhydride and derivatives thereof, and dimethyl-1,4-cyclohexanedicarboxylic acid.

Examples of the long-chain alkyl diol used for the preparation of the dicarboxylic acid (ii) include 1,6-hexanediol, 3-methyl-1,5-pentanediol, 2-ethyl-1,3-hexanediol, 2-butyl-2-ethyl-1,3-propanediol, 2-methyl-1,8-octanediol, and 1,9-nonanediol. Examples of the polyether diol include triethylene glycol, tetraethylene glycol, octamethylene glycol, propylene glycol, dipropylene glycol, tripropylene glycol, tetrapropylene glycol, and octapropylene glycol.

Examples of the acid anhydride used for the preparation of the dicarboxylic acid (ii) include phthalic anhydride, succinic anhydride, tetrahydrophthalic anhydride, and hexahydrophthalic anhydride.

Specific examples of the compound, (iii) include carboxyl-terminated polyester polyols produced by adding lactones such as β-propiolactone, β-butyrolactone, γ-butyrolactone, γ-valerolactone, δ-valerolactone, γ-caprolactone, ε-caprolactone, and β-methyl-δ-valerolactone to dibasic acids. Examples of the dibasic acids used herein include the dibasic acids used for the preparation of the polyester dicarboxylic acid.

In the compound (A), the polyester dicarboxylic acid in (i) is preferred in terms of flexibility. In the polyester dicarboxylic acid, a polyester dicarboxylic acid produced by allowing adipic acid to react, with ethylene glycol is preferred because both durability and flexibility can be achieved.

By making a divalent group that is produced from such a compound and is represented by the formulae (3) to (5) have a number-average molecular weight of 250 to 10,000, appropriate flexibility can be imparted to the resultant cured product.

Preferred examples of the compound (B) that provides a moiety represented by the formula (2) and has two glycidyl groups in each molecule include a bisphenol A epoxy resin, a bisphenol S epoxy resin, a bisphenol F epoxy resin, and a bisphenol AD epoxy resin. Examples of such bisphenol epoxy resins include compounds represented by a formula (6). In particular, the bisphenol A epoxy resin represented by the formula where E represents —$C(CH_3)_2$— is preferred because the resultant cured product has high adhesion to a light reflecting film composed of a silver alloy or the like and high durability and the bisphenol A epoxy resin contributes to reduction of the cost of an ultraviolet curable composition used in the present invention.

[Chem. 6]

(6)

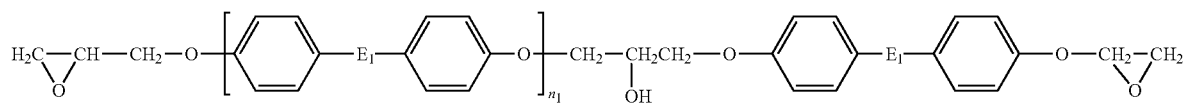

(in the formula, Ex represents —$SO_2$—, —$CH_2$—, —CH($CH_3$)—, or —C($CH_3$)$_2$—, and $n_1$ represents an integer of 0 to 8).

The weight per epoxy equivalent of the epoxy resin is preferably 150 to 1,000, more preferably 150 to 700, because a good coating property can be provided.

Examples of the compound (C) having a single radical-polymerizable unsaturated double bond and a single carboxyl group include (meth)acyclic acid, acrylic dimer, a half ester compound obtained from a hydroxyalkyl (meth)acrylate and a dibasic anhydride, and a compound obtained by adding a lactone compound to a carboxyl group of the foregoing. The compound (C) is preferably acyclic acid in terms of curability.

[Chem. 8]

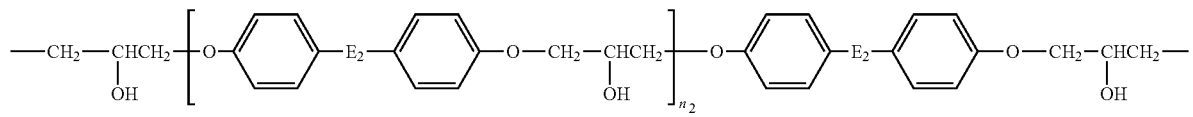

In an ultraviolet curable composition according to the present invention, the content of an epoxy (meth)acrylate represented by the formula (1) with respect to the total amount of radical-polymerizable compounds in the ultraviolet curable composition is preferably 10 to 80 mass %, more preferably 20 to 70 mass %. The ultraviolet curable composition may contain a publicly known substance such as a radical-polymerizable monomer, an oligomer, a photopolymerization initiator, or a thermal polymerization initiator. An ultraviolet curable composition according to the present invention may further contain a desired publicly known additive and a desired publicly known auxiliary.

When an epoxy (meth)acrylate represented by the formula (1) is synthesized, a mixture of epoxy (meth)acrylates whose $r_1$s in the formula (1) are various is normally obtained. When the mixture is analyzed by, for example, gel permeation chromatography, a distribution of compounds whose $r_1$s represent various values (for example, $r_1$s represent about 0 to 50) can be observed. Accordingly, when an ultraviolet curable composition according to the present invention is prepared, it is convenient to use the mixture. When such a mixture is used, a mixture is preferably used in which the total content of epoxy (meth)acrylates whose $r_1$s in the formula (1) represent 1 to 15 with respect to the radical-polymerizable compounds in the mixture is 30 to 90 mass %, more preferably 35 to 80 mass %. A mixture in which, the content of epoxy (meth)acrylates whose $r_1$s represent 1 to 10 is 20 to 80 mass % is preferable, more preferably 25 to 80 mass %. A mixture in which the content of epoxy (meth)acrylates whose $r_1$s represent 1 to 8 is 15 to 70 mass % is preferable, more preferably 15 to 70 mass %. Use of such a mixture facilitates the preparation of an ultraviolet curable composition that provides advantages of the present invention. In the present invention, use of an epoxy (meth)acrylate represented by the formula (1) provides an ultraviolet curable composition with which a light transmitting layer that is less likely to cause degradation of a light reflecting layer is provided. In addition to providing a light transmitting layer that is less likely to cause degradation of a light reflecting layer, the light transmitting layer has high flexibility. Thus, the ultraviolet curable composition provides an optical disc that is less likely to warp.

A modified epoxy acrylate represented by the following formula (7) can be preferably used.

[Chem. 7]

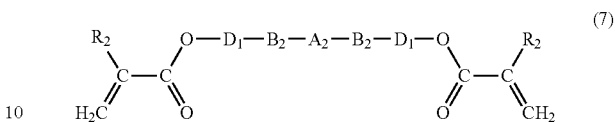

[in the formula (7), $R_2$s each independently represent a hydrogen atom or a methyl group; $A_2$ is a group represented by a formula (8)

(in the formula (8), $E_2$ represents —$SO_2$—, —$CH_2$—, —CH($CH_3$)—, or —C($CH_3$)$_2$—, and $n_2$ represents an integer of 0 to 8), and $B_2$ is a group represented by a formula (9)

[Chem. 9]

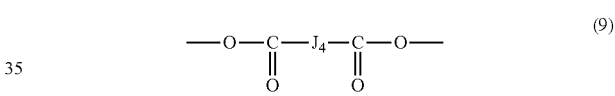

(in the formula (9), $J_4$ represents a divalent aromatic hydrocarbon group in which a hydrogen atom may be replaced with an alkyl group having 1 to 6 carbon atoms or a divalent aliphatic hydrocarbon group that has 2 to 10 carbon atoms and may nave a branched chain), and $D_1$ is a group represented by a formula (10)

[Chem. 10]

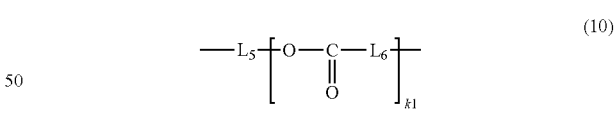

(in the formula (10), $L_5$ and $L_6$ each, independently represent a divalent aliphatic hydrocarbon group that has 2 to 10 carbon atoms and may have a branched chain; and $k_1$ each independently represent an integer of 1 to 20), or a formula (11)

[Chem. 11]

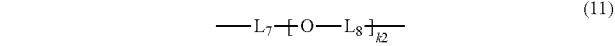

(in the formula (11), $L_7$ and $L_8$ each independently represent a divalent aliphatic hydrocarbon group that has 2 to 10 carbon atoms and may have a branched chain; and $k_2$ each independently represent an integer of 1 to 20.)).

A modified epoxy acrylate represented by the formula (7) can be produced by, for example, allowing a hydroxyalkyl (meth)acrylate (a1) to react with a dicarboxylic anhydride (a2) and an epoxy resin (a3).

The hydroxyalkyl (meth)acrylate (a1) is preferably a lactone adduct of a hydroxyalkyl (meth)acrylate. Such a lactone adduct can be produced by ring-opening addition of a lactone to a hydroxyalkyl (meth)acrylate.

Examples of such a hydroxyalkyl (meth)acrylate used in the preparation of a lactone adduct of a hydroxyalkyl (meth) acrylate include 2-hydroxyethyl (meth)acrylate, 2-hydroxypropyl (meth)acrylate, and 4-hydroxybutyl (meth)acrylate.

Examples of such a lactone include β-propiolactone, β-butyrolactone, γ-butyrolactone, γ-valerolactone, δ-valerolactone, γ-caprolactone, and ε-caprolactone.

As a lactone adduct of a hydroxyalkyl (meth)acrylate, a lactone adduct of 2-hydroxyethyl acrylate is preferable; in particular, a lactone adduct in which 1 or 2 mol of a lactone on average is added to 1 mol of 2-hydroxyethyl acrylate is preferable. In addition, an ε-caprolactone adduct of 2-hydroxyethyl acrylate is preferable; and an ε-caprolactone adduct in which 1 or 2 mol of ε-caprolactone is added to 2-hydroxyethyl acrylate is preferable in view of properties of a cured, coating film.

Note that ε-caprolactone (1 mol) adduct 2-hydroxyethyl acrylate, ε-caprolactone (2 mol) adduct 2-hydroxyethyl acrylate, ε-caprolactone (3 mol) adduct 2-hydroxyethyl acrylate, and the like are commercially available.

Examples of the epoxy resin (a3) include a bisphenol A epoxy resin, a bisphenol F epoxy resin, a phenol novolac epoxy resin, a cresol novolac epoxy resin, and an epoxy resin in which the aromatic rings of a bisphenol epoxy resin are hydrogenated.

The weight per epoxy equivalent of the epoxy resin (a3) is preferably 150 to 1,000, more preferably 150 to 700, because a good coating property can be provided. Among the epoxy resins, bisphenol epoxy resins are preferable because a cured coating film that is well-balanced between hardness and ductility can be formed.

As another epoxy (meth)acrylate, for example, an epoxy acrylate may be used that is produced by allowing a glycidyl ether epoxy compound to react with (meth)acrylic acid. Such a glycidyl ether epoxy compound may be, for example, bisphenol A or an alkylene oxide adduct of bisphenol A diglycidyl ether, bisphenol F or an alkylene oxide adduct of bisphenol F diglycidyl ether, hydrogenated bisphenol A or an alkylene oxide adduct of hydrogenated bisphenol A diglycidyl ether, hydrogenated bisphenol F or an alkylene oxide adduct of hydrogenated bisphenol F diglycidyl ether, ethylene glycol diglycidyl ether, propylene glycol diglycidyl ether, or neopentyl glycol diglycidyl ether. One or more active-energy-ray-curable oligomers of such epoxy (meth)acrylates can be used.

A branched epoxy (meth)acrylate (E1) is preferably used that includes at least one of structural units represented by formulae (12) and (13),

[Chem. 12]

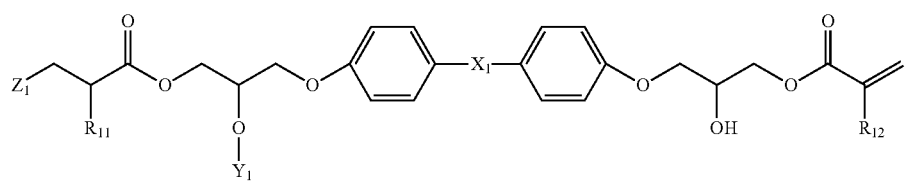

(12)

[Chem. 13]

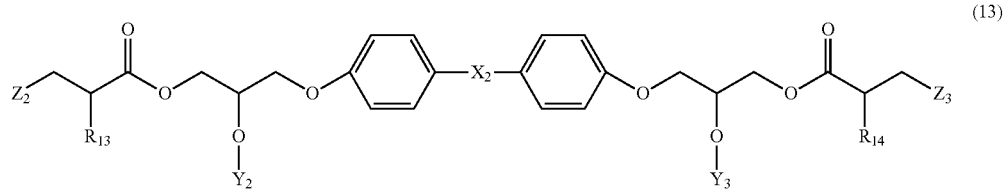

(13)

Examples of the dicarboxylic anhydride (a2) include maleic anhydride, phthalic anhydride, succinic anhydride, tetrahydrophthalic anhydride, and hexahydrophthalic anhydride. In particular, phthalic anhydride is preferable.

(in the formulae (12) and (13), $X_1$ and $X_2$ each independently represent —$SO_2$—, —$CH_2$—, —$CH(CH_3)$—, or —$C(CH_3)_2$—; $R_{11}$ to $R_{14}$ each independently represent a hydrogen atom or a methyl group), and structural units represented by formulae (14) and (15),

[Chem. 14]

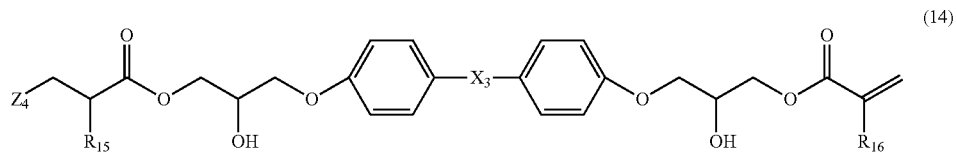

(14)

(in the formula (14), $X_3$ represents —$SO_2$—, —$CH_2$—, —$CH(CH_3)$—, or —$C(CH_3)_2$—; $R_{15}$ and $R_{16}$ each independently represent a hydrogen atom or a methyl group),

[Chem. 15]

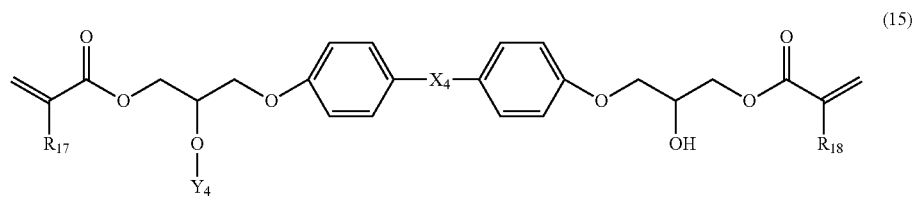

(15)

(in the formula (15), $X_4$ represents —$SO_2$—, —$CH_2$—, —$CH(CH_3)$—, or —$C(CH_3)_2$—; $R_{17}$ and $R_1$s each independently represent a hydrogen atom, or a methyl group), where $Y_1$ in a structural unit represented by the formula (12) is bonded to any one of $Z_1$ to $Z_3$ of other structural units represented by the formulae (12) and (13) or $Z_4$ in the formula (14), $Y_2$ and $Y_3$ in a structural unit represented by the formula (13) represent a hydrogen atom, or are bonded to any-one of $Z_1$ to $Z_3$ of other structural units represented by the formulae (12) and (13) or $Z_4$ in the formula (14), and $Z_1$ to $Z_3$ in structural units represented by the formulae (12) and (13) are bonded to any one of $Y_1$ to $Y_3$ of other structural units represented by the formulae (12) and (13) or $Y_4$ in the formula (15).

In the branched epoxy (meth)acrylate (E1), a branched epoxy (meth)acrylate (E1) in which $X_1$ to $X_4$ represent $C(CH_3)_2$ and $R_{11}$ to $R_{18}$ represent a hydrogen atom is preferred because it can be produced at a low cost and it facilitates reaction control.

The branched epoxy (meth)acrylate (E1) may be used as an epoxy (meth)acrylate mixture with an epoxy (meth)acrylate (E2) represented by a formula (16)

[Chem. 16]

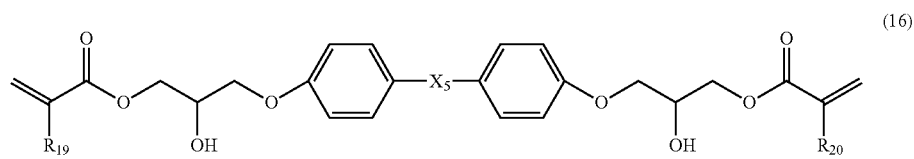

(16)

(in the formula (16), $X_5$ represents —$SO_2$—, —$CH_2$—, —$CH(CH_3)$—, or —$C(CH_3)_2$—; $R_{19}$ and $R_{20}$ each independently represent a hydrogen atom or a methyl group). In the production of the branched epoxy (meth)acrylate (E1), the epoxy (meth)acrylate (E2) represented by the formula (16) is normally generated and hence use of a mixture of (E1) and (E2) is advantageous in the production procedures.

In the branched epoxy (meth)acrylate (E1), a branched epoxy (meth)acrylate represented by a formula (17) is preferable because it facilitates reaction control.

[Chem. 17]

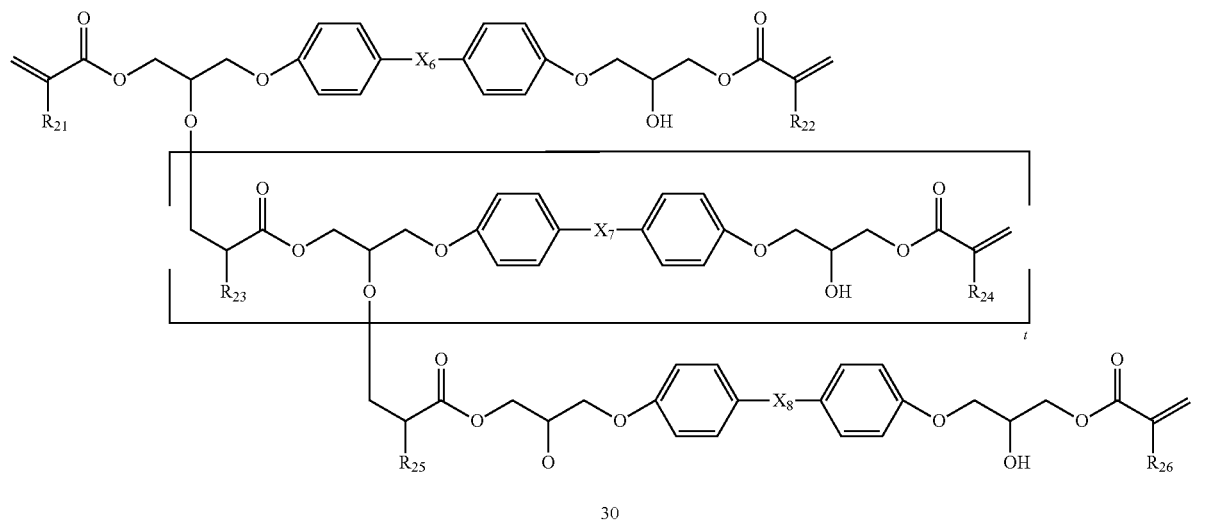

(17)

(in the formula (17), $X_6$ to $X_8$ each independently represent —$SO_2$—, —$CH_2$—, —$CH(CH_3)$—, or —$C(CH_3)_2$—; $R_{21}$ to $R_{26}$ each independently represent a hydrogen atom or a methyl group; and t represents 0 to 20.) In particular, a branched epoxy (meth)acrylate in which $X_6$ to $X_8$ represent —$C(CH_3)_2$— and $R^{11}$ to $R_{16}$ represent a hydrogen atom is preferred because it can be produced at a low cost and it facilitates reaction control.

The branched epoxy (meth)acrylate (E1) is characterized in that it has a large number of branched moieties in the molecular skeleton and hence the structure of a coating film having been cured with ultraviolet rays has a high crosslinking density; in particular, since it intramolecularly has a phenyl skeleton, it has a rigid molecular skeleton due to the phenyl skeleton; thus, even when it is designed such that the content of an acryloyl group is made low and the occurrence of the crosslinking reaction due to ultraviolet curing is reduced, a coating film can be designed to have a high hardness. Specifically, distortion in the cured film due to curing contraction caused in ultraviolet curing can be relieved. As a result, an optical-disc coating material that forms a coating film having a high elastic modulus and causes less warpage even when the thickness of the coating film is designed to be large can be achieved. Such a material is optimal for applications of an optical disc in which recording and reproduction of signals are performed with a blue laser beam, the optical disc requiring very thick light transmitting layer among optical discs.

When the branched epoxy (meth)acrylate (E1) is synthesized, it is normally obtained as a mixture of the branched epoxy (meth)acrylate (E1) in which a structural unit represented by the formula (12) or (13) is repeated n times ranging from 1 to 100 and an epoxy (meth)acrylate represented by the formula (16). When the mixture is analyzed by, for example, gel permeation chromatography, a distribution of compounds whose n represents various values can be observed. Accordingly, when an ultraviolet curable composition according to the present invention is prepared, it is convenient to use the mixture. When such a mixture is used, a mixture is preferably used in which the content of a branched epoxy (meth)acrylate whose n represents 1 to 100 is 30 mass % or more, more preferably 35 mass % or more.

In the present invention, the weight-average molecular weight (Mw) of the branched epoxy (meth)acrylate (E1) determined from, results obtained by measuring the mixture of the branched epoxy (meth)acrylate (E1) and the epoxy (meth)acrylate represented by the formula (16) by gel permeation chromatography (GPC), is preferably 1,000 to 10,000, more preferably 1,500 to 8,000, still more preferably 2,000 to 6,000. When the molecular weight of the branched epoxy (meth)acrylate (E1) is made be in such a range, an excessively high viscosity can be avoided and the content of the branched epoxy (meth)acrylate (E1) contained as an essential component in an ultraviolet curable composition according to the present invention can be made high. The ratio of the branched epoxy (meth)acrylate (E1) to the epoxy (meth)acrylate (E2) in the mixture in terms of area ratio in a chromatogram measured by the GPC is preferably as follows: the branched epoxy (meth)acrylate (E1)/the epoxy (meth)acrylate (E2)= 10/1 to 1/2, more preferably 5/1 to 1/1, still more preferably 3/1 to 3/2.

The weight-average molecular weight by GPC can be determined by, for example, measurement of the molecular weight in terms of polystyrene standards in which an HLC-8220 manufactured by Tosoh Corporation, four columns of Super HZM-M, THE serving as a solvent are used; the flow rate is 1.0 ml/min; the column temperature is 40° C.; and the detector temperature is 30° C.

When the branched epoxy (meth)acrylate (E1) is used, the content of the branched epoxy (meth)acrylate (E1) with respect to the total amount of radical-polymerizable compounds contained in an ultraviolet curable composition is preferably 10 to 80 mass %, more preferably 20 to 70 mass %.

In the present invention, as an acrylate oligomer, a urethane (meth)acrylate may be used. Examples of such a urethane (meth)acrylate include polyurethane (meth)acrylates such as a urethane (meth)acrylate having a polyether skeleton, a urethane (meth)acrylate having a polyester-skeleton, and a urethane (meth)acrylate having a polycarbonate skeleton.

In particular, a urethane (meth)acrylate (U1) is preferably used that is produced from a compound intramolecularly having three or more hydroxyl groups, a compound intramolecularly having two or more isocyanate groups, and a compound having a hydroxyl group and a (meth)acryloyl group. Use of the urethane (meth)acrylate (U1) can impart flexibility to a cured film so that warpage due to change in the heat and humidity environment is less likely to be caused. The urethane bonds of such a urethane (meth)acrylate enhance a cohesion property and cohesive failure is less likely to be caused. Thus, the resultant cured product has appropriate adhesion.

Examples of the compound having three or more hydroxyl groups include trimethylolpropane, ditrimethylolpropane, pentaerythritol, dipentaerythritol, glycerin, polyglycerin; alkylene oxide (such as ethylene oxide, propylene oxide, 1,2-butylene oxide, 1,3-butylene oxide, or 2,3-butylene oxide) adducts of the foregoing; and lactone (such as e-caprolactone) adducts of the foregoing.

Examples of the compound intramolecularly having two or more isocyanate groups include polyisocyanates such as tetramethylene diisocyanate, hexamethylene diisocyanate, trimethylhexamethylene diisocyanate, bis(isocyanatemethyl)cyclohexane, cyclohexane diisocyanate, bis(isocyanatecyclohexyl)methane, isophorone diisocyanate, tolylene diisocyanate, xylylene diisocyanate, diphenylmethane diisocyanate, m-phenylene diisocyanate, and norbornene diisocyanate. Of these, diisocyanate compounds intramolecularly having two isocyanate groups are preferably used. In particular, isophorone diisocyanate is preferable because it does not suffer from deterioration of hue or degradation of light-beam transmittance.

Examples of the compound having a hydroxyl group and a (meth)acryloyl group include hydroxyethyl (meth)acrylate, hydroxypropyl (meth)acrylate, hydroxybutyl (meth)acrylate, hydroxycaprolactone (meth)acrylate, and compounds produced by allowing such a (meth)acrylate to react with a compound having two or more hydroxyl groups. The examples further include compounds produced by allowing a compound having two or more hydroxyl groups to react with (meth)acrylic acid: for example, addition reaction products between a glycidyl ether compound and (meth)acrylic acid, mono(meth)acrylates of glycol compounds, and the like.

The weight-average molecular weight (Mw) of the urethane (meth)acrylate (U1) measured by gel permeation chromatography (GPC) is preferably 1,000 to 20,000, more preferably 1,500 to 15,000. In such a case, an optical disc produced with an ultraviolet curable composition according to the present invention has high durability and high light resistance. In the GPC, an HLC-8020 manufactured, by Tosoh Corporation, columns of GMHxl-GMHxl-G200Hxl-G1000Hxlw, THF serving as a solvent are used; the flow rate is 1.0 ml/min; the column temperature is 40° C.; the detector temperature is 30° C.; and the molecular weight is measured in terms of polystyrene standards.

When the urethane (meth)acrylate (U1) is used, the content thereof in the ultraviolet curable compounds contained in a ultraviolet curable composition is preferably 40 mass % or less, particularly preferably 30 mass % or less. By making the content of the urethane (meth)acrylate (U1) be in such a range, appropriate flexibility can be imparted to a cured film and, in particular, a cured film that is less likely to warp under change in the heat and humidity environment can be achieved.

[(Meth)acrylate Monomer]

The (meth)acrylate monomer is not particularly limited: a (meth)acrylate monomer having a single (meth)acryloyl group in a single molecule (hereafter, referred to as a monofunctional (meth)acrylate), a (meth)acrylate monomer having two (meth)acryloyl groups in a single molecule (hereafter, referred to as a bifunctional (meth)acrylate), and a (meth)acrylate monomer having three or more (meth)acryloyl groups in a single molecule (hereafter, referred to as a polyfunctional (meth)acrylate monomer) can be used; and, by appropriately mixing such monomers, a composition that has a desired viscosity and provides a desired elastic modulus after curing can be obtained.

Examples of the monofunctional (meth)acrylate include aliphatic (meth)acrylates such as ethyl (meth)acrylate, butyl (meth)acrylate, 2-ethylhexyl (meth)acrylate, nonyl (meth)acrylate, tridecyl (meth)acrylate, hexadecyl (meth)acrylate, octadecyl (meth)acrylate, isoamyl (meth)acrylate, isodecyl (meth)acrylate, isostearyl (meth)acrylate, ethoxyethoxyethyl (meth)acrylate, 2-hydroxyethyl (meth)acrylate, 3-chloro-2-hydroxypropyl (meth)acrylate, methoxyethyl (meth)acrylate, and butoxyethyl (meth)acrylate; aromatic (meth)acrylates such, as nonylphenoxyethyl (meth)acrylate, 2-hydroxy-3-phenoxypropyl (meth)acrylate, phenoxyethyl (meth)acrylate, and benzyl, (meth)acrylate; alicyclic (meth)acrylates such as dicyclopentenyl (meth)acrylate, dicyclopentanyl (meth)acrylate, dicyclopentenyloxyethyl (meth)acrylate, tetracyclododecanyl (meth)acrylate, cyclohexyl (meth)acrylate, tetrahydrofurfuryl (meth)acrylate, and glycidyl (meth)acrylate; caprolactone-modified tetrahydrofurfuryl (meth)acrylate; acryloylmorpholine; isobornyl (meth)acrylate; norbornyl (meth)acrylate; and 2-(meth)acryloyloxymethyl-2-methylbicycloheptaneadamantyl (meth)acrylate.

In particular, when tetrahydrofurfuryl acrylate and phenoxyethyl acrylate are used, a change in the thickness of a film is small and a change in warpage is also small, which is preferable.

Examples of the bifunctional (meth)acrylate include 1,4-butanediol di(meth)acrylate, 3-methyl-1,5-pentanediol di(meth)acrylate, 1,6-hexanediol di(meth)acrylate, neopentyl glycol di(meth)acrylate, 2-methyl-1,8-octanediol di(meth)acrylate, 2-butyl-2-ethyl-1,3-propanediol di(meth)acrylate, ethylene glycol di(meth)acrylate, trimethylolpropane di(meth)acrylate, pentaerythritol di(meth)acrylate, polypropylene glycol di(meth)acrylate, di(meth)acrylate of a diol that is obtained by adding 4 mol or more of ethylene oxide or propylene oxide to 1 mol of neopentyl glycol, ethylene-oxide-modified phosphate (meth)acrylate, ethylene-oxide-modified alkylated phosphate di(meth)acrylate, diethylene glycol di(meth)acrylate, dipropylene glycol di(meth)acrylate, tripropylene glycol di(meth)acrylate, polyether (meth)acrylate, and diethylaminoethyl (meth)acrylate; as for (meth)acrylates having an alicyclic moiety, examples of an alicyclic bifunctional (meth)acrylate include norbornanedimethanol di(meth)acrylate, norbornanediethanol di(meth)acrylate, di(meth)acrylate of a diol obtained by adding 2 mol of ethylene oxide or propylene oxide to norbornanedimethanol, tricyclodecanedimethanol di(meth)acrylate, tricyclodecanediethanol di(meth)acrylate, di(meth)acrylate of a diol obtained by adding 2 mol of ethylene oxide or propylene oxide to tricyclodecanedimethanol, pentacyclopentadecanedimethanol di(meth)acrylate, pentacyclopentadecanediethanol di(meth)acrylate, di(meth)acrylate of a diol obtained by adding 2 mol of ethylene oxide or propylene oxide to pentacyclopentadecanedimethanol, di(meth)acrylate of a diol obtained by adding 2 mol of ethylene oxide or propylene oxide to pentacyclopentadecanediethanol, dimethyloldicyclopentane di(meth)acrylate, hydroxypivalaldehyde-modified trimethylolpropane di(meth)acrylate, hydroxypivalic acid neopentyl glycol di(meth)acrylate, ethylene-oxide-modified bisphenol A di(meth)acrylate, and propylene-oxide-modified bisphenol A di(meth)acrylate.

Of these, tricyclodecanedimethanol di(meth)acrylate, tripropylene glycol di(meth)acrylate, hydroxypivalic acid neopentyl glycol di(meth)acrylate, ethylene-oxide-modified bisphenol A di(meth)acrylate, and the like are preferable; and, in particular, hydroxypivalic acid neopentyl glycol di(meth)acrylate and ethylene-oxide-modified bisphenol A di(meth)acrylate are preferable.

To adjust an elastic modulus after curing to be high, a (meth)acrylate having a functionality of three or more may be used. Examples of such a polyfunctional (meth)acrylate include bis(2-acryloyloxyethyl)hydroxyethyl isocyanurate, bis(2-acryloyloxypropyl) hydroxypropyl isocyanurate, bis(2-acryloyloxybutyl)hydroxybutyl isocyanurate, bis(2-methacryloyloxyethyl)hydroxyethyl isocyanurate, bis(2-methacryloyloxypropyl)hydroxypropyl isocyanurate, bis(2-methacryloyloxybutyl)hydroxybutyl isocyanurate, tris(2-acryloyloxyethyl) isocyanurate, tris(2-acryloyloxypropyl) isocyanurate, tris(2-acryloyloxybutyl) isocyanurate, tris(2-methacryloyloxyethyl) isocyanurate, tris(2-methacryloyloxypropyl) isocyanurate, tris(2-methacryloyloxybutyl) isocyanurate, trimethylolpropane tri(meth)acrylate, ditrimethylolpropane tetra(meth)acrylate, pentaerythritol tri(meth)acrylate, pentaerythritol tetra(meth)acrylate, dipentaerythritol penta(meth)acrylate, dipentaerythritol hexa(meth)acrylate, di- or tri(meth)acrylate of a triol obtained by adding 3 or more mol of ethylene oxide or propylene oxide to 1 mol of trimethylol propane, and a poly (meth)acrylate of dipentaerythritol.

If necessary, an ultraviolet curable compound such as N-vinylpyrrolidone, N-vinylcaprolactam, a vinyl ether monomer, or a phosphate-group-containing (meth)acrylate may also be used.

As for the ultraviolet curable composition used for the light transmitting layer, the composition should be prepared such that a cured film after irradiation with ultraviolet rays has an elastic modulus and a loss modulus in the above-described ranges, the loss modulus being measured by a dynamic viscoelastic measurement method; and a cured film having such an elastic modulus and such a loss modulus measured by a dynamic viscoelastic measurement method can provide a light transmitting layer that is less likely to warp and tends to recover from deformation caused under a load for a long period of time. Such a light transmitting layer that is less likely to warp and tends to recover even from deformation caused under an external load for a long period of time can provide an optical disc that is highly reliable over a long period of time.

As for the ultraviolet curable composition used for the light transmitting layer, to make a cured film after irradiation with ultraviolet rays have an elastic modulus and a loss modulus in the specific ranges, the loss modulus being measured by a dynamic viscoelastic measurement method, it is effective to design the composition such that a low elastic modulus is provided and plastic deformation is suppressed. To obtain such a composition, an oligomer having, for example, a rigid bisphenol epoxy moiety and a flexible polyester moiety is used. Thus, the elastic modulus of the resultant cured film can be made low; distortion in the cured film due to curing can be relieved; and warpage can be suppressed. When the composition is used for a light transmitting layer in an optical disc having a reflecting film composed of silver or a silver alloy, high durability and high light resistance can be provided. As for the monomers, when the content of a monofunctional (meth)acrylate is made low and the content of a bifunctional (meth)acrylate is made high, plastic deformation is less likely to be caused, which is preferable.

When a particularly preferred composition in which the content of a monofunctional (meth)acrylate in the ultraviolet curable compounds contained in an ultraviolet curable composition according to the present invention is 30 mass % or less is employed, plastic deformation becomes less likely to be caused.

As the (meth)acrylate monomer, it is preferred that a bifunctional (meth)acrylate be mainly used. The content of such a bifunctional (meth)acrylate in the ultraviolet curable compounds is preferably 40 to 95 mass %, more preferably 40 to 80 mass %.

When the composition is designed such that a bifunctional (meth)acrylate is a main component, as the bifunctional (meth)acrylate, a bifunctional (meth)acrylate having an aromatic ring or an alicyclic skeleton is preferably used such that the content thereof in the ultraviolet curable compounds is 40 mass % or more.

Preferred examples of the bifunctional (meth)acrylate having an aromatic ring or an alicyclic skeleton include tricyclodecane dimethanol di(meth)acrylate, tripropylene glycol di(meth)acrylate, hydroxypivalic acid neopentyl glycol di(meth)acrylate, and bifunctional (meth)acrylates having a bisphenol A moiety such as ethylene-oxide-modified bisphenol A di(meth)acrylate and propylene-oxide-modified bisphenol A di(meth)acrylate.

In particular, a bifunctional (meth)acrylate having an aromatic ring is preferably used; a bifunctional (meth)acrylate having a bisphenol A moiety is preferably used; ethylene-oxide-modified bisphenol A di(meth)acrylate or propylene-oxide-modified bisphenol A di(meth)acrylate is particularly preferred.

When a bifunctional (meth)acrylate is used as a main component, the bifunctional (meth)acrylate preferably has a weight-average molecular weight of 200 to 1,200, preferably 300 to 900. By using a bifunctional (meth)acrylate having a molecular weight in such a range, warpage of a cured film tends to be reduced.

When a (meth)acrylate having a functionality of three or more is used as the (meth)acrylate monomer, the content thereof is preferably 50 mass % or less, more preferably 30 mass % or less for the purpose of reducing the warpage.

The concentration of an acryloyl group contained in an ultraviolet curable composition according to the present invention is preferably 4.00 mmol/g or less, preferably in the range of 2.9 to 3.4 mmol/g, particularly preferably in the range of 2.9 to 3.2 mmol/g because warpage of a cured film tends to be reduced.

In the present invention, an acrylate oligomer and an acrylate monomer are preferably used as the (meth)acrylate oligomer and the (meth)acrylate monomer because good curability is exhibited in UV radiation and an appropriate cured film tends to be provided. When a methacrylate oligomer and a methacrylate monomer are used, the content of the methacrylate components in the ultraviolet curable compounds contained, in the ultraviolet curable composition is preferably 20 mass % or less, particularly preferably 10 mass % or less because good curability is exhibited in UV radiation.

[Initiators and Additives]

An ultraviolet curable composition for an optical disc, the ultraviolet curable composition being used for a light transmitting layer, may contain a publicly known photopolymerization initiator, a publicly known thermal polymerization initiator, and the like, in addition to the (meth)acrylate oligomer and the (meth)acrylate monomer.

Examples of usable photopolymerization initiators include molecular-cleavage-type photopolymerization initiators such as benzoin isobutyl ether, benzil, 1-hydroxycyclohexylphenyl ketone, benzoin ethyl ether, benzyl dimethyl ketal, 2-hydroxy-2-methyl-1-phenylpropane-1-one, 1-(4-isopropylphenyl)-2-hydroxy-2-methylpropane-1-one, 2-methyl-1-(4-methylthiophenyl)-2-morpholinopropane-1-one, 2-hydroxy-1-{4-[4-(2-hydroxy-2-methyl-propionyl)-benzyl]-phenyl}-2-methyl-propane-1-one, 1-[4-(2-hydroxyethoxy)-phenyl]-2-hydroxy-2-methyl-1-propane-1-one, phenylglyoxylic acid methyl ester, and 2,4,6-trimethylbenzoyl-diphenylphosphine oxide; and hydrogen-extraction-type photopolymerization initiators such as benzophenone, 4-phenylbenzophenone, isophthalphenone, 4-benzoyl-4'-methyl-diphenylsulfide, 2,4-diethylthioxanthone, and 2-isopropylthioxanthone.

If necessary, the ultraviolet curable composition used for the light transmitting layer may contain, as additives, a surfactant, a leveling agent, a thermal polymerization inhibitor, an antioxidant such as hindered phenol or phosphite, and a light stabilizer such as hindered amine. Examples of a sensitizing agent that can be used include trimethylamine, methyldimethanolamine, triethanolamine, p-dimethylaminoacetophenone, ethyl p-dimethylamino benzoate, isoamyl p-dimethylamino benzoate, N,N-dimethylbenzylamine, and 4,4'-bis(diethylamino)benzophenone; furthermore, an amine that does not cause addition reaction with the above-described photopolymerizable compound can also be used in combination.

As for the ultraviolet curable composition used for the light transmitting layer, by adjusting the ultraviolet curable compounds so as to have a viscosity of 500 to 5,000 mPa·s, preferably 1,000 to 3,000 mPa·s, more preferably 1,500 to 2,500 mPa·s, a light transmitting layer having a large thickness can be appropriately formed.

An ultraviolet curable composition according to the present invention preferably provides a cured film having a glass transition temperature of 50° C. or less, more preferably 40° C. or less. When such a temperature range is satisfied, recovery from signal errors can be appropriately achieved before and after a load test.

[Configuration of Optical Disc]

Optical discs according to the present invention include discs for reproduction only and discs allowing for recording and reproduction. Such a disc for reproduction only can be produced in the following manner: pits serving as an information recording layer are formed in injection molding of a single circular resin substrate; a light reflecting layer is then formed on the information recording-layer; an ultraviolet curable composition is subsequently applied to the light reflecting layer by a spin-coating method or the like; and the ultraviolet curable composition is then cured by irradiation with ultraviolet rays to form a light transmitting layer. Such a disc allowing for recording and reproduction can be produced in the following manner: a light reflecting layer is formed on a single circular resin substrate; an information recording layer constituted by a phase change film, a magneto-optical recording film, or the like is then formed; an ultraviolet curable composition is subsequently applied to the light reflecting layer by a spin-coating method or the like; and the ultraviolet curable composition is then cured by irradiation with ultraviolet rays to form a light transmitting layer.

When an ultraviolet curable composition applied to the light reflecting layer is cured by irradiation with ultraviolet rays, for example, a continuous light radiation process employing a metal halide lamp, a high-pressure mercury-vapor lamp, or the like may be performed or a flash radiation process described in U.S. Pat. No. 5,904,795 may be performed. The flash radiation process is preferred because curing can be efficiently achieved.

When ultraviolet rays are radiated, this radiation is preferably controlled such that a cumulative amount of light becomes 0.05 to 1 J/cm$^2$. The cumulative amount of light is more preferably 0.05 to 0.8 J/cm$^2$, particularly preferably 0.05 to 0.6 J/cm$^2$. An ultraviolet curable composition used for an optical disc according to the present invention is sufficiently cured even with a low cumulative amount of light; tucks are not generated in the end surface or the surface of the optical disc; and the optical disc does not warp or distort.

In the case of a writable optical disc, an information recording layer is disposed between a light reflecting layer and a light transmitting layer. The information recording layer should be a layer in which information can be recorded and from which information can be reproduced, and may be any one of a phase change recording layer, a magneto-optical recording layer, and an organic coloring matter recording layer.

When the information recording layer is a phase change recording layer, the information recording layer is normally constituted by a dielectric layer and a phase change film. The dielectric layer is required to have a function of buffering heat generated in the phase change layer and a function of adjusting the reflectivity of the disc, and is composed of a mixture of ZnS and SiO$_2$. The phase change film is configured to produce a difference in reflectivity between an amorphous state and a crystalline state due to phase change of the film, and may be composed of a Ge—Sb—Te alloy, a Sb—Te alloy, or a Ag—In—Sb—Te alloy.

In an optical disc according to the present invention, two or more information recording regions may be formed. For example, an optical disc for reproduction only may have a configuration in which a first light reflecting layer and a first light transmitting layer are stacked on a substrate having pits; a second light reflecting layer and a second light transmitting layer are formed on the first light transmitting layer or another layer stacked on the first light transmitting layer. In this case, pits are formed in the first light transmitting layer or the other layer stacked on the first light transmitting layer. Although an optical disc allowing for recording and reproduction has a configuration in which an information recording layer, a light reflecting layer, and a light transmitting layer are stacked on a substrate, it may have a configuration having two information recording layers by further forming a second light reflecting layer, a second information recording layer, and a second light transmitting layer on the light transmitting layer; or it may have a configuration having three or more information recording layers by similarly stacking layers. When a plurality of layers are stacked, the total thickness of the layers should be appropriately adjusted to be the above-described thickness.

In an optical disc according to the present invention, although a light transmitting layer may be the top layer, a hard coat layer may be further formed on the surface thereof. The hard coat layer preferably has a small film thickness, preferably 5 μm or less in view of warpage of the optical disc. In an optical disc according to the present invention, by forming a hard coat layer on a flexible light transmitting layer, an increase in signal errors caused by damage of the surface due to scratching or the like and an increase in signal errors caused by plastic deformation of the optical disc due to, for example, an external load for a long period of time can be appropriately suppressed, which is preferable.

In an optical disc according to the present invention, a signal error SER after a load is applied to the surface of a light transmitting layer is preferably $10^{-2}$ or less because the number of signal reproduction failures is small.

EMBODIMENTS

Hereinafter, as specific examples of an optical disc according to the present invention, examples of specific configurations of a monolayer-type optical disc and a bilayer-type optical disc will be described.

As a preferred embodiment of a monolayer-type optical disc among optical discs according to the present invention, for example, a configuration illustrated in FIG. 1 can be exemplified in which a light reflecting layer 2 and a light transmitting layer 3 are stacked on a substrate 1, and a blue laser beam is made incident from the light transmitting layer side to record or reproduce information. The irregularities in the figure schematically represent a recording track (groove). The light transmitting layer 3 is constituted by a cured product of an ultraviolet curable composition according to the present invention and has a thickness of 100±10 μm. The substrate 1 has a thickness of about 1.1 mm. The light reflecting film is a thin film composed of silver or the like.

FIG. 2 illustrates a configuration in which a hard coat layer 4 is provided on the top layer of the configuration illustrated in FIG. 1. The hard coat layer preferably has a high hardness and high abrasion resistance. The hard coat layer preferably has a thickness of 1 to 5 μm, more preferably 3 to 5 μm.

As a preferred embodiment of a multilayer-type optical disc, for example, a configuration of a bilayer-type optical disc illustrated in FIG. 3 can be exemplified in which a light reflecting layer 5 and a light transmitting layer 6 are stacked on a substrate 1, a light reflecting layer 2 and a light transmitting layer 3 are further stacked thereon, and a blue laser beam is made incident from the light transmitting layer 3 side to record or reproduce information. The light transmitting layer 3 and the light transmitting layer 6 are constituted by cured products of ultraviolet curable compositions and at least one of the layers is formed from an ultraviolet curable composition according to the present invention. As for the thickness of the layers, the total of the thickness of the light transmitting layer 3 and the thickness of the light transmitting layer 6 is 100±10 μm. The substrate 1 has a thickness of about 1.1 mm. The light reflecting film is a thin film composed of silver or the like.

In a bilayer-type optical disc having such a configuration, a recording track (groove) is also formed in the surface of the light transmitting layer 6. Accordingly, the light transmitting layer 6 may be constituted by a plurality of layers in which a layer constituted by a cured film of an ultraviolet curable composition that appropriately forms a recording track is stacked on a layer constituted by a cured film of an ultraviolet curable composition that provides high adhesion. In this configuration, a hard coat layer is also preferably provided as the top layer.

Hereinafter, a method for producing the optical disc illustrated in FIG. 1 will be described.

A polycarbonate resin is first subjected to injection molding to produce the substrate 1 having a guide groove that is referred to as a recording track (groove) and is tracked by a laser beam. The light reflecting layer 2 is then formed by sputtering or vapor deposition of a silver alloy or the like on the recording track side surface of the substrate 1. An ultraviolet curable composition according to the present invention is applied to the light reflecting layer 2 and irradiated with ultraviolet rays from one side or both sides of the disc to cure the ultraviolet curable composition to thereby form the light transmitting layer 3. Thus, the optical disc in FIG. 1 is produced. In the case of the optical disc in FIG. 2, the hard coat layer 4 is further formed thereon by spin coating or the like.

Hereinafter, a method for producing the optical disc illustrated in FIG. 3 will be described.

A polycarbonate resin is first subjected to injection molding to produce the substrate 1 having a guide groove that is referred to as a recording track (groove) and is tracked by a laser beam. The light reflecting layer 6 is then formed by sputtering or vapor deposition of a silver alloy or the like on the recording track side surface of the substrate 1.

The light transmitting layer 5 formed from an ultraviolet curable composition according to the present invention or an ultraviolet curable composition is formed on the light reflecting layer 6. At this time, a recording track (groove) is imprinted in the surface of the light transmitting layer 5 with a mold. A step of imprinting the recording track (groove) is performed in the following manner. An ultraviolet curable composition is applied to the light reflecting layer 6 formed on the substrate 1. The mold for forming the recording track (groove) is bonded to the applied ultraviolet curable composition. Ultraviolet rays are radiated from one side or both sides of the bonded disc to cure the ultraviolet curable composition. After that, the mold is released and the light reflecting layer 2 is formed by sputtering or vapor deposition of a silver alloy or the like on the recording track (groove) side surface of the light transmitting layer 5. An ultraviolet curable composition is applied to the light reflecting layer 2 and irradiated with ultraviolet rays to cure the ultraviolet curable composition to thereby form the light transmitting layer 3. Thus, the optical disc in FIG. 3 can be produced. When phase change recording layers are used on the light reflecting layers, an optical disc can be produced in much the same manner as that described above.

EXAMPLES

Hereinafter, the present invention will be described in detail with respect to Synthetic examples and Examples. However, the present invention is not limited to these Examples. The term "part" in the following Examples denotes "part by mass".

Synthetic Example 1

In a flask equipped with a thermometer, a stirrer, and a reflux condenser, 65.5 g of phenoxyethyl acrylate was placed; 189 g of a bisphenol A epoxy resin (weight per epoxy equivalent: 189 g/eq, EPICLON850 manufactured by Dainippon Ink and Chemicals) was dissolved therein; 0.1 g of hydroquinone serving as a polymerization inhibitor was added; and 50.7 g (0.7 mol) of acrylic acid was then added. As a catalyst, 0.48 g of triphenyl phosphine was added, and the temperature of the resultant mixture was increased to 130° C. over 2 hours under stirring. The mixture was maintained 0° C. for 6 hours. It was then confirmed that the mixture had an acid value of 0 mg/KOH and the temperature of the mixture was subsequently decreased to 80° C. and mixed with 22.2 g (0.3 mol) of acrylic acid. The temperature of the mixture was increased back to 130° C. over an hour; the mixture was mixed with 0.48 g of triphenyl phosphine, and maintained for 4 hours to provide a reaction mixture that was a transparent pale-yellow resin-like mixture (acid value=0.2 mg/KOH, butyl acetate-diluted Gardner viscosity (reaction mixture/butyl acetate=80/20)=$U^2$–V, weight per epoxy equivalent=15,000) containing a branched epoxy acrylate (EA1).

The obtained mixture of the branched epoxy (meth)acrylate (EA1) was measured by GPC in terms of molecular-weight distribution (FIG. 4). The results showed that the branched epoxy (meth)acrylate (EA1) had a number-average molecular weight (Mn) of 2,507 and a weight-average molecular weight (Mw) of 3,786. The area ratio of the branched epoxy acrylate (EA-1) to the epoxy acrylate represented by the formula (16), the area ratio being represented as (branched epoxy acrylate)/(epoxy acrylate represented by formula (16)), was 1.63.

Synthetic Example 2

The same system as in Synthetic example 1 was charged with 230 g of caprolactone-modified β-hydroxyethyl acrylate (hydroxyl value=244 mg/KOH, PLACCEL FA1-DDM, manufactured by DAICEL CHEMICAL INDUSTRIES, LTD.), 148 g of phthalic anhydride, and 0.1 g of hydroquinone serving as a polymerization inhibitor; and the temperature of the resultant mixture was increased to 120° C. over 2 hours under stirring. The mixture was maintained at 120° C. for 10 hours. It was then confirmed that the mixture had an acid value of 148 mg/KOH and the temperature of the mixture was subsequently decreased to 80° C. The mixture was mixed with 189 g of a bisphenol A epoxy resin and 2.85 g of triphenyl phospnine. The temperature of the mixture was increased back to 120° C. and the mixture was then maintained for 4 hours to provide a reaction mixture that was a transparent pale-yellow resin-like mixture (acid value=0.7, butyl acetate-diluted viscosity (reaction mixture/butyl acetate=70/30)=F–G, weight per epoxy equivalent=10,200) containing an epoxy (meth)acrylate resin (EA-2). Measurement results in terms of molecular-weight distribution by GPC showed that the epoxy acrylate resin (EA2) had a number-average molecular weight (Mn) of 1,360 and a weight-average molecular weight (Mw) of 3,840.

Synthetic Example 3

To a reaction vessel equipped with a stirrer, a rectifying column, a water separator, a condenser, a thermometer, and a nitrogen inlet tube, 91 parts of ethylene glycol and 318 parts of adipic acid were added and the temperature of the resultant mixture was increased to 140° C. over an hour under stirring. The temperature was further increased to 230° C. over 3 hours and the resultant mixture was allowed to react for 3 hours at 230° C. The resultant solution was cooled when the acid value was 221 KOHmg/g. After the solution was cooled to 100° C., the solution was mixed with 529 parts of EPICLON850 (bisphenol A epoxy resin, manufactured by Dainippon Ink and Chemicals, weight per epoxy equivalent: 188 g/eq) and 0.2 parts of triphenyl phosphine, and the resultant mixture was allowed to react at 120° C. for 4 hours. The acid value was 7.5 KOHmg/g. Under air flow without the nitrogen inlet tube, the resultant solution was mixed with 99 parts of acrylic acid (98%), 0.5 parts of hydroquinone monomethylether, 1 part of triphenyl phosphine, and 258 parts of phenoxyethyl acrylate; and the resultant mixture was allowed to react at 110° C. for 12 hours. A modified epoxy acrylate resin (EA-3) that was semisolid resin-like matter having an acid value of 1.7 KOHmg/g was obtained. The obtained modified epoxy acrylate was measured by GPC in terms of molecular weight and it was found to have a number-average molecular weight (Mn) of 2,000, a weight-average molecular weight (Mw) of 6,400, and a distribution (Mw/Mn) of 3.20.

Compositions mixed in accordance with formulations in Table 1 below (numerical values in the formulations in the table represent parts by mass) were heated for 3 hours at 60° C. and melted to prepare ultraviolet curable compositions of Examples (Examples 1 to 11) and Comparative examples (Comparative examples 1 to 4). The resultant compositions were evaluated in the following manner and the results are described in Table 1.

<Measurement Method of Viscosity>

The ultraviolet curable compositions were measured in terms of viscosity at 25° C. with a B-type viscometer (BM-type, manufactured by TOKYO REIKI INC.).

<Production Conditions of Optical Discs for Evaluation>

Polycarbonate substrates having a diameter of 120 mm and a thickness of 1.1 ram were provided. In each substrate, a film having a thickness of 20 to 40 nm was formed on a surface by sputtering with a silver-alloy target GBD05 (alloy of silver serving as a main component and bismuth) manufactured by Kobelco Research Institute, Inc.; and a silicon nitride (SiNx) film having a thickness of 5 to 10 nm was formed on the opposite surface by sputtering. The compositions in Table 1 were applied to the silver-alloy reflecting films of the resultant substrates with a spin-coating experimental coater. The compositions were irradiated with 2 shots of ultraviolet rays for precuring and 2.0 snots of ultraviolet rays for curing with a xenon flash radiation apparatus (Model: FUV-201WJ02) manufactured, by USHIO INC. to thereby cure the compositions. Hardcoat Daicure Clear HC-1 (manufactured by DIC Corporation) was applied to the cured films such that the applied films had a thickness of about 3 μm; and the films were cured with 10 shots with the radiation apparatus. Thus, test sample discs having a light transmitting layer with a thickness of 100±5 μm were obtained.

<Measurement Method of Elastic Modulus and Plastic Deformation Percentage>

A Vickers indenter having a vertex angle of 136° was indented into the surface of the light transmitting layer of each sample disc obtained in the above-described manner in accordance with a load program in FIG. 5 with a FISCHERSCOPE HM2000Xyp (Fischer Instruments K.K.) to thereby measure loss modulus $E_{IT}$ and plastic deformation percentage Cm.

<Measurement Method of Dynamic Viscoelastic Spectrum>

The light transmitting layer was blanked with a dumbbell cutter into a specimen having the shape of Specimen No. 5 according to JIS K 7127. The obtained specimen was measured with a dynamic visco-elastometer RSA-II (frequency: 3.5 Hz, temperature increase rate: 3° C./min) manufactured by Rheometric Scientific, Inc. to thereby determine loss modulus and loss tangent at 60° C. The temperature of the peak of loss tangent in the dynamic viscoelastic spectrum was defined as glass transition temperature.

<Warpage Evaluation>

Warp angle was measured with an argus blu manufactured by Dr. Schwab Inspection Technology GmbH. The warp angle was determined from the average value of radial tilts in a radial range from 55 to 56 ram. Each sample disc was measured with an environmental test chamber "PR-2PK" (manufactured by ESPEC Corp.) in terms of warp angles before and after exposure (durability test) to a high-temperature high-humidity environment at 80° C. at 85% RH for 240 hours; and variation in warp angle before and after the test was determined as disc warpage. Note that the warp angle before the durability test was a value measured when each composition was cured and left in an environment at 25° C. at 45% RH for one day; and the warp angle after the durability test was a value measured when each sample disc was left in an environment at 80° C. at 85% RH for 240 hours, then taken out from the environment, and left in an environment at 25° C. at 45% RH for one day. Herein, when a warp angle is represented as a positive (+) value, it means that the disc warps to a side opposite to the composition-coated side; when a warp angle is represented as a negative (−) value, it means that the disc warps to the coated side.

<Measurement of Error Rate of Optical Discs>

A nonwoven fabric sheet for storing CDs was placed on the surface of the light transmitting layer of each sample disc; a 625 g weight (a load of 24.9 g/mm² per unit area) was placed on the sheet in a radial range from 35 to 45 mm, and the load had been applied to the sample disc for 96 hours at 23° C. at 50% RH. After that, the disc was taken out and immediately measured in terms of error rate Random. SER with "BD MASTER" manufactured by PULSTEC INDUSTRIAL CO., LTD, Average values of Random SER immediately after the load test, 1 hour after the load test, and 4 hours after the load test were evaluated on the basis of the following grading system.

Excellent: less than $2\times10^{-4}$
Good: $2\times10^{-4}$ or more and less than $5\times10^{-3}$
Poor: $5\times10^{-3}$ or more

TABLE 1

|  | Example 1 | Example 2 | Example 3 | Example 4 | Example 5 | Example 6 | Example 7 | Example 8 |
|---|---|---|---|---|---|---|---|---|
| EA-1 |  | 10 | 32 | 24 | 20 |  |  |  |
| EA-2 | 42 | 32 |  |  |  |  |  |  |
| EA-3 |  |  |  |  |  | 45 | 32 | 18 |
| EA-4 |  |  |  |  |  |  |  |  |
| UA-1 |  |  |  |  |  |  |  |  |
| HPNDA | 10 | 10 |  |  |  | 15 | 18 |  |
| CL-modified HPNDA | 48 | 48 |  |  |  | 40 |  |  |
| BisA-4EO-DA |  |  | 10 | 26 | 20 |  | 18 | 18 |
| BisA-6PO-DA |  |  |  |  |  |  |  |  |
| BisA-10EO-2A |  |  | 43 | 45 | 60 |  | 32 | 64 |
| PEA |  |  | 15 |  |  |  |  |  |
| CBA |  |  |  | 5 |  |  |  |  |
| Irg184D |  | 2 |  |  |  | 2 | 2 | 2 |
| Irg127 | 1 |  | 1 | 1 | 1 |  |  |  |
| PM-2 | 0.004 | 0.004 | 0.004 | 0.004 | 0.004 | 0.004 | 0.004 | 0.004 |
| GA | 0.02 | 0.02 | 0.02 | 0.02 | 0.02 | 0.02 | 0.02 | 0.02 |
| total | 101.024 | 102.024 | 101.024 | 101.024 | 101.024 | 102.024 | 102.024 | 102.024 |
| Content of monofunctional monomer (wt %) | 0.0% | 2.0% | 21.2% | 9.7% | 4.0% | 8.8% | 6.3% | 3.5% |
| Content of bifunctional monomer (wt %) | 57.4% | 56.8% | 52.5% | 70.3% | 79.2% | 53.9% | 66.7% | 80.4% |
| Concentration of acryloyl group (mmol/g) | 3.12 | 3.25 | 3.31 | 3.21 | 2.96 | 3.15 | 3.16 | 2.60 |
| Elastic modulus [MPa] | 540 | 680 | 830 | 710 | 490 | 275 | 544 | 105 |
| Plastic deformation percentage [%] | 49 | 45 | 57 | 46 | 40 | 24 | 38 | 1.2 |
| Glass transition temperature [° C.] | 44 | 41 | 38 | 37 | 34 | 42 | 46 | 24 |
| E" at 60° C. [MPa] (loss modulus) | 5 | 5 | 2 | 2 | 1 | 5 | 9 | 0.17 |
| tanδ at 60° C. (loss tangent) | 0.17 | 0.16 | 0.06 | 0.05 | 0.03 | 0.18 | 0.25 | 0.006 |
| Disc warpage | 0.07 | 0.17 | 0.11 | 0.06 | 0.05 | −0.27 | −0.28 | −0.04 |
| Error rate measurement result Before load test | $6.0 \times 10^{-5}$ | $6.0 \times 10^{-5}$ | $7.0 \times 10^{-5}$ | $6.0 \times 10^{-5}$ | $6.0 \times 10^{-5}$ | $4.4 \times 10^{-5}$ | $2.6 \times 10^{-5}$ | $1.9 \times 10^{-5}$ |
| Load test Immediately after | $5.3 \times 10^{-3}$ | $1.4 \times 10^{-2}$ | $1.1 \times 10^{-2}$ | $4.9 \times 10^{-3}$ | $1.1 \times 10^{-3}$ | $4.5 \times 10^{-5}$ | $3.2 \times 10^{-4}$ | $2.2 \times 10^{-5}$ |
| 1 hour after | $9.0 \times 10^{-5}$ (Excellent) | $1.6 \times 10^{-3}$ (Good) | $1.1 \times 10^{-3}$ (Good) | $8.0 \times 10^{-4}$ (Good) | $1.8 \times 10^{-4}$ (Excellent) | $4.5 \times 10^{-5}$ (Excellent) | $2.6 \times 10^{-5}$ (Excellent) | $4.8 \times 10^{-5}$ (Excellent) |
| 4 hours after | $9.0 \times 10^{-5}$ (Excellent) | $1.6 \times 10^{-4}$ (Excellent) | $9.0 \times 10^{-5}$ (Excellent) | $7.0 \times 10^{-5}$ (Excellent) | $1.7 \times 10^{-4}$ (Excellent) | $4.5 \times 10^{-5}$ (Excellent) | $2.6 \times 10^{-5}$ (Excellent) | $2.2 \times 10^{-5}$ (Excellent) |

TABLE 2

|  | Example 9 | Example 10 | Example 11 | Comparative example 1 | Comparative example 2 | Comparative example 3 | Comparative example 4 |
|---|---|---|---|---|---|---|---|
| EA-1 |  |  |  |  |  |  |  |
| EA-2 |  |  | 32 |  |  |  | 30 |
| EA-3 | 45 | 32 |  |  |  |  |  |
| EA-4 |  |  |  |  |  | 40 |  |
| UA-1 |  |  |  | 20 | 25 |  |  |

TABLE 2-continued

| | Example 9 | Example 10 | Example 11 | Comparative example 1 | Comparative example 2 | Comparative example 3 | Comparative example 4 |
|---|---|---|---|---|---|---|---|
| HPNDA | | | | 10 | | 15 | 20 |
| CL-modified HPNDA | | | | | | 45 | |
| BisA-4EO-DA | | 18 | 18 | | 40 | | 20 |
| BisA-6PO-DA | | | | 70 | | | |
| BisA-10EO-2A | 40 | 40 | 40 | | 35 | | 30 |
| PEA | | | | | | | |
| CBA | 15 | 10 | 10 | | | | |
| Irg184D | 2 | 2 | 2 | | | 2 | 2 |
| Irg127 | | | | 1 | 1 | | |
| PM-2 | 0.004 | 0.004 | 0.004 | 0.004 | 0.004 | 0.004 | 0.004 |
| GA | 0.02 | 0.02 | 0.02 | 0.02 | 0.02 | 0.02 | 0.02 |
| total | 102.024 | 102.024 | 102.024 | 101.024 | 101.024 | 102.024 | 102.024 |
| Content of monofunctional monomer (wt %) | 23.5% | 16.1% | 9.8% | 4.0% | 4.9% | 0.0% | 0.0% |
| Content of bifunctional monomer (wt %) | 39.2% | 56.8% | 56.8% | 79.2% | 74.2% | 58.8% | 68.6% |
| Concentration of acryloyl group (mmol/g) | 2.55 | 2.75 | 2.76 | 3.25 | 3.17 | 4.05 | 3.28 |
| Elastic modulus [MPa] | 74 | 94 | 100 | 1580 | 1710 | 2200 | 1413 |
| Plastic deformation percentage [%] | 0.4 | 0.5 | 0.5 | 32 | 29 | 20 | 45 |
| Glass transition temperature [° C.] | 9 | 20 | 27 | 51 | 53 | 81 | 53 |
| E" at 60° C. [MPa] (loss modulus) | 0.00175 | 0.225 | 0.13 | 15 | 23 | 193 | 26 |
| tan δ at 60° C. (loss tangent) | 0.000122 | 0.01 | 0.006 | 0.42 | 0.48 | 0.21 | 0.49 |
| Disc warpage | 0.00 | −0.05 | 0.00 | −0.31 | −0.28 | −0.94 | −0.38 |
| Error rate measurement result Before load test | $3.0 \times 10^{-5}$ | $2.4 \times 10^{-5}$ | $2.0 \times 10^{-5}$ | $6.0 \times 10^{-5}$ | $6.0 \times 10^{-5}$ | $3.3 \times 10^{-5}$ | $1.6 \times 10^{-5}$ |
| Load test Immediately after | $4.7 \times 10^{-5}$ | $2.6 \times 10^{-5}$ | $4.5 \times 10^{-5}$ | $2.5 \times 10^{-2}$ | $2.5 \times 10^{-2}$ | $8.2 \times 10^{-3}$ | $1.4 \times 10^{-2}$ |
| 1 hour after | $4.7 \times 10^{-5}$ (Excellent) | $2.6 \times 10^{-5}$ (Excellent) | $4.3 \times 10^{-5}$ (Excellent) | $2.1 \times 10^{-2}$ (Poor) | $1.9 \times 10^{-2}$ (Poor) | $6.3 \times 10^{-3}$ (Poor) | $6.8 \times 10^{-3}$ (Poor) |
| 4 hours after | $4.5 \times 10^{-5}$ (Excellent) | $2.6 \times 10^{-5}$ (Excellent) | $2.2 \times 10^{-5}$ (Excellent) | $1.5 \times 10^{-2}$ (Poor) | $1.4 \times 10^{-2}$ (Poor) | $5.7 \times 10^{-3}$ (Poor) | $6.8 \times 10^{-4}$ (Good) |

Symbols in Table 1 are as follows.

EA-1: epoxy acrylate described in Synthetic example 1 (epoxy acrylate represented by the formula (17) where $X_6$ to $X_8$ represent —$C(CH_3)_2$— and $R_{21}$ to $R_{26}$ represent a hydrogen atom)

EA-2: epoxy acrylate described in Synthetic example 2 (epoxy acrylate represented by the formula (7) where $A_2$ is represented by the formula (8), $B_2$ is represented by the formula (9), $D_2$ is represented by the formula (10); $E_2$ in the formula (8) represents —$C(CH_3)_2$—, $J_4$ in the formula (9) is represented by a formula (18),

[Chem. 18]

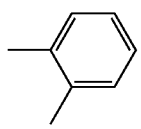

(18)

in the formula (10), $L_5$ represents —$(CH_2)_2$—, $L_6$ represents —$(CH_2)_5$—, and $k_1$ represents 1)

EA-3: epoxy acrylate described in Synthetic example 3 (epoxy acrylate represented by the formula (1) where $A_1$ is represented by the formula (2), $B_1$ is represented by the formula (3); $E_1$ in the formula (2) represents —$C(CH_3)_2$—, and, in the formula (3), $J_1$ represents —$(CH_2)_4$— and $L_1$ represents —$(CH_2)_2$—)

EA-4: epoxy acrylate having a structure in which acrylic acid is directly added to glycidyl groups of a bisphenol A epoxy resin ("UNIDIC V-5530" manufactured by DIG Corporation)

UA-1: "Photomer6019-20P" trifunctional urethane acrylate diluted with 20% phenoxyethyl acrylate (manufactured by Cognis)

HPNDA: hydroxypivalic acid neopentyl glycol diacrylate (manufactured by DAI-ICHI KOGYO SEIYAKU CO., LTD.)

CL-modified HPNDA: caprolactone-modified hydroxypivalic acid neopentyl glycol diacrylate (manufactured by Nippon Kayaku Co., Ltd.)

BisA-4EO-DA: EO-modified (4 mol) bisphenol A diacrylate (manufactured by DAI-ICHI KOGYO SEIYAKU CO., LTD.)

BisA-6PO-DA: PO-modified (6 mol) bisphenol A diacrylate (manufactured by DAI-ICHI KOGYO SEIYAKU CO., LTD.)

BisA-10EO-DA: EO-modified (10 mol) bisphenol A diacrylate (manufactured by DAI-ICHI KOGYO SEIYAKU CO., LTD.)

PEA: phenoxyethyl acrylate (manufactured by Kyoeisha Chemical Co., Ltd.)

CBA: ethylcarbitol acrylate (manufactured by OSAKA ORGANIC CHEMICAL INDUSTRY LTD.)

PM-2: ethylene-oxide-modified phosphate methacrylate (manufactured by Nippon Kayaku Co., Ltd.)

GA: gallic acid (manufactured by Dainippon Sumitomo Pharma Co., Ltd.)

Irg184D: 1-hydroxycyclohexylphenyl ketone

Irg127: 2-hydroxy-1-{4-[4-(2-hydroxy-2-methyl-propionyl)-benzyl]-phenyl}-2-methyl-propane-1-one Table 1 shows that the optical discs of Examples 1 to 11 in which compositions according to the present invention were used had low error rates after 1 hour and 4 hours from the load test and exhibited good signal characteristics. In contrast, the optical discs of Comparative examples 1 to 4 had high error rates after 1 hour and 4 hours from the load test and had problems in reproduction of signals.

Figure 1:
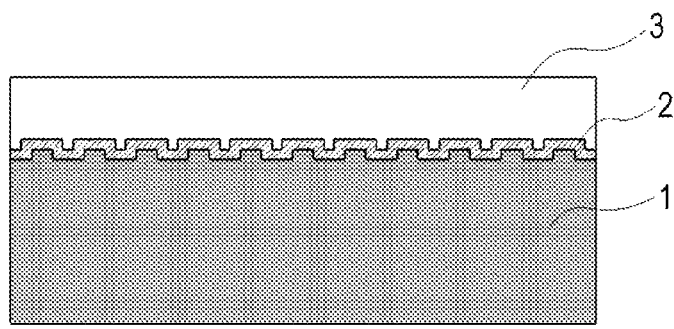
FIG. 1 illustrates an example of a monolayer-type optical disc according to the present invention.
Figure 2:
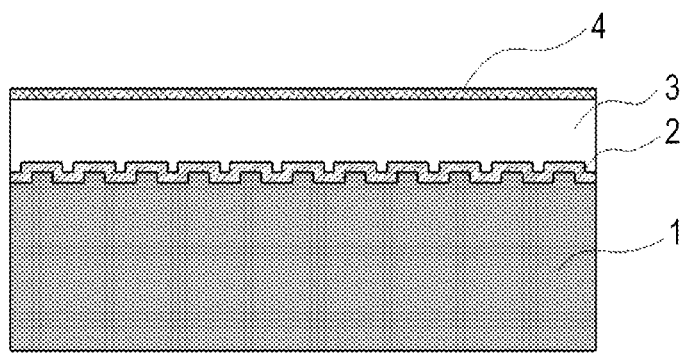
FIG. 2 illustrates an example of a monolayer-type optical disc according to the present invention.
Figure 3:
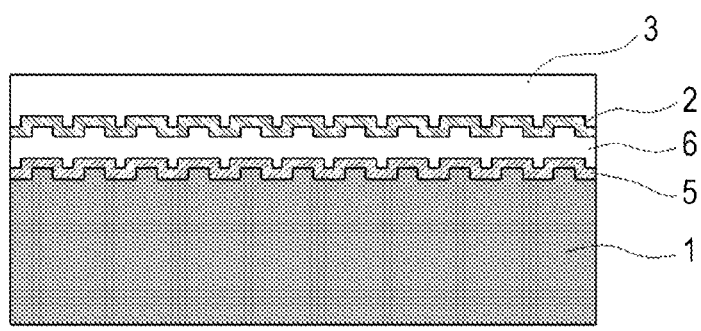
FIG. 3 illustrates an example of a bilayer-type optical disc according to the present invention.
Figure 4:
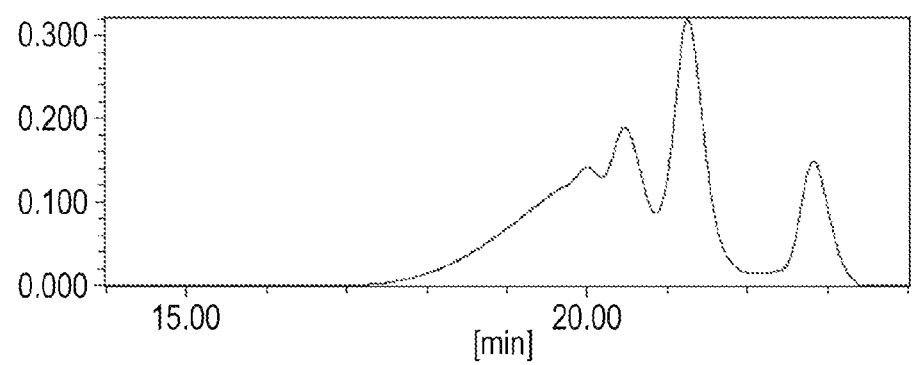
FIG. 4 illustrates a molecular-weight distribution of epoxy acrylate measured by GPC in Synthetic example 1.
Figure 5:
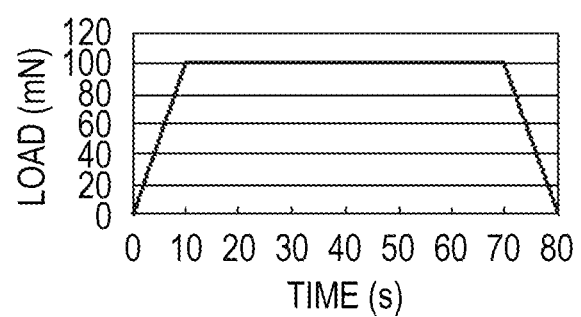
FIG. 5 illustrates a load program diagram in a measurement of elastic modulus and plastic deformation percentage in Examples.

REFERENCE SIGNS LIST 1 substrate
2 light reflecting layer
3 light transmitting layer of ultraviolet curable composition
4 hard coat layer
5 light reflecting layer
6 light transmitting layer of ultraviolet curable composition

The invention claimed is:

1. An optical disc in which at least a light reflecting layer and a light transmitting layer that includes a cured film of an ultraviolet curable composition are stacked on a substrate, and information is reproduced by making a blue laser beam be incident on the optical disc from a side of the light transmitting layer,
wherein the elastic modulus at 25° C. as measured by indenting a Vickers indenter having a vertex angle of 136° under a load of 100 mN into a surface of the cured film of the ultraviolet curable composition is 1500 MPa or less;
the loss modulus (E") at 60° C. in a dynamic viscoelastic spectrum of the cured film measured at a frequency of 3.5 Hz is 10 MPa or less;
the loss tangent (tan δ) at 60° C. in the dynamic viscoelastic spectrum of the cured film measured at a frequency of 3.5 Hz is 0.25 or less; and
the cured film has a glass transition temperature of 50° C. or less, and
wherein the ultraviolet curable composition contains, as a (meth)acrylate oligomer, an epoxy (meth)acrylate represented by the formula (1)

$$R_1 \underset{H_2C}{\overset{O}{\underset{\|}{C}}}-\overset{R_1}{\underset{\|}{C}}-O-[A_1-B_1]_{r_1}-A_1-O-\overset{R_1}{\underset{\|}{C}}-\overset{R_1}{\underset{\|}{C}}-CH_2 \quad (1)$$

wherein in the formula (1), $R_1$s each independently represent a hydrogen atom or a methyl group; $A_1$ is a group represented by the formula (2)

$$\begin{array}{c} -CH_2-CHCH_2-O-\left[\phantom{x}\phantom{x}\phantom{x}-E_1-\phantom{x}\phantom{x}\phantom{x}-O-CH_2-\right. \\ | \\ OH \\ \left. -CHCH_2-O-\phantom{x}\phantom{x}\phantom{x}-E_1-\phantom{x}\phantom{x}\phantom{x}-O-CH_2-CHCH_2- \right]_{n_1} \\ | \\ OH \qquad\qquad\qquad\qquad\qquad\qquad\qquad\qquad OH \end{array} \quad (2)$$

wherein in the formula (2), $E_1$s each independently represent a divalent group represented by $SO_2$—, —CH($CH_3$)—, or —C($CH_3$)$_2$—, and $n_1$ represents an integer of 0 to 8, and $B_1$ is one or more groups selected from the group consisting of formulae (3) to (5)

$$\left[O-\overset{O}{\underset{\|}{C}}-J_1-\overset{O}{\underset{\|}{C}}-O-L_1\right]_{m_1}-O-\overset{O}{\underset{\|}{C}}-J_1-\overset{O}{\underset{\|}{C}}-O- \quad (3)$$

$$-O-\overset{O}{\underset{\|}{C}}-J_2-\overset{O}{\underset{\|}{C}}-O-L_2-O-\overset{O}{\underset{\|}{C}}-J_2-\overset{O}{\underset{\|}{C}}-O- \quad (4)$$

$$\left[O-\overset{O}{\underset{\|}{C}}-L_3\right]_{m_2}-O-\overset{O}{\underset{\|}{C}}-J_3-\overset{O}{\underset{\|}{C}}-O-\left[L_4-\overset{O}{\underset{\|}{C}}-O\right]_{m_3} \quad (5)$$

wherein in the formulae (3) to (5), $J_1$ to $J_3$ represent a divalent aromatic hydrocarbon group or a divalent aliphatic hydrocarbon group having 2 to 20 carbon atoms; $L_1$ represents a divalent aliphatic hydrocarbon group having 2 to 20 carbon atoms or a divalent group represented by —(RO)$_q$—R— where R represents an alkylene group having 2 to 8 carbon atoms and q represents an integer of 1 to 10; $L_2$ represents an alkyl diol residue or a polyether diol residue, each of which has a number-average molecular weight of 250 to 10,000; $L_3$ and $L_4$ each independently represent a divalent aliphatic hydrocarbon group having 2 to 10 carbon atoms; and $m_1$, $m_2$, and $m_3$ each independently represent an integer of 1 to 20, and
wherein the ultraviolet curable composition contains at least one of ethylene-oxide-modified bisphenol A di(meth)acrylate or propylene-oxide-modified bisphenol A di(meth)acrylate.

2. The optical disc according to claim 1, wherein the light transmitting layer has a thickness of 70 to 110 μm.

3. The optical disc according to claim 1, wherein the light reflecting layer, the light transmitting layer, and a hard coat layer are sequentially stacked directly on the substrate including a recording track.

4. The optical disc according to claim 2, wherein the light reflecting layer, the light transmitting layer, and a hard coat layer are sequentially stacked directly on the substrate including a recording track.

5. The optical disc according to claim 1, wherein the elastic modulus at 25° C. is measured by indenting a Vickers indenter having a vertex angle of 136° under a load of 100 mN into a surface of the cured film of the ultraviolet curable composition is from 50 to 275 MPa.

6. The optical disc according to claim 2, wherein the elastic modulus at 25° C. is measured by indenting a Vickers indenter having a vertex angle of 136° under a load of 100 mN into a surface of the cured film of the ultraviolet curable composition is from 50 to 275 MPa.

* * * * *